United States Patent [19]
Janssen et al.

[11] Patent Number: 6,127,481
[45] Date of Patent: Oct. 3, 2000

[54] BRANCHED POLYOLEFIN POLYMERS AS ADDITIVES IN FUEL AND LUBRICATING OIL COMPOSITIONS

[75] Inventors: Koen Jan Gerarda Janssen; Claude Leo Bostoen, both of Bilzen, Belgium

[73] Assignee: DSM Copolymer, Inc., Geleen, Netherlands

[21] Appl. No.: 08/683,518

[22] Filed: Jul. 12, 1996

Related U.S. Application Data

[63] Continuation-in-part of application No. 08/511,402, Aug. 4, 1995, Pat. No. 6,084,030.

[51] Int. Cl.[7] .................................................. C08G 77/12
[52] U.S. Cl. ............................................ 525/106; 525/910
[58] Field of Search ...................................... 525/106, 910

[56] References Cited

U.S. PATENT DOCUMENTS

| | | | |
|---|---|---|---|
| 5,030,659 | 7/1991 | Cozewith et al. | 525/207 |
| 5,276,110 | 1/1994 | Zhou et al. | 525/479 |
| 5,395,885 | 3/1995 | Kennedy et al. | 525/98 |

FOREIGN PATENT DOCUMENTS 0217505  12/1983  Japan .

*Primary Examiner*—Jeffrey C. Mullis
*Attorney, Agent, or Firm*—Rockey, Milnamow & Katz, Ltd.

[57] ABSTRACT

A branched polyolefin additive for use in fuel and/or lubricating oil in the form of a comb, star, nanogel and structural combinations thereof in which a plurality of polyolefin arms are attached to a backbone having repeating units containing aliphatic groups, aromatic groups, heteroatom-containing groups and combinations thereof, to provide a branched polymeric additive in which the properties of the additive can be conveniently tailored to a single or multi-functional performance criteria of a fuel and/or lubricating oil composition.

8 Claims, No Drawings

BRANCHED POLYOLEFIN POLYMERS AS ADDITIVES IN FUEL AND LUBRICATING OIL COMPOSITIONS

This application is a continuation-in-part of application Ser. No. 08/511,402, filed Aug. 4, 1995 U.S. Pat. No. 6,084,030.

This invention relates to the use of branched polyolefin polymers as additives in petroleum distillates such as fuels and lubricating oils as dispersants, detergents, and/or enhanced performance viscosity index improvers. Branched polyolefin polymers when incorporated into lubricating oil as an additive compositions impart improved low temperature viscosity and thickening efficiency without adversely impacting mechanical shear stability of the formulated oil. Minor amounts of branched polyolefin polymers can impart both detergent and dispersant properties when blended into fuels.

BACKGROUND OF THE INVENTION

As well-known to those skilled in the art, hydrocarbon polymers have been employed for modifying the performance properties of petroleum distillates. The viscosities of petroleum distillates particular lubricating oils vary with temperatures and since performance criteria today demand ever broader temperature ranges for use, additives are incorporated into the lubricating oil to control (the viscosity-temperature relationship). This viscosity-temperature relationship of an oil is known as its viscosity index (VI). The higher the viscosity index, the less the change in viscosity with temperature. Therefore, an ideal viscosity index improver (VII) would exhibit a negligible viscosity contribution to the lubricating oil at low temperature while providing a large viscosity contribution at temperatures of engine operation.

Traditionally, essentially linear olefin copolymers, particular ethylene-propylene copolymers (referred to as OCP's) have been employed in lubricating oils as viscosity index improvers, pour depressants, dispersants. See generally U.S. Pat. Nos. 3,522,180; 3,524,732; 3,879,304; 4,026,809; 4,089,794; 4,137,185; 4,146,489; 4,171,273; 4,320,019; 4,340,689; 4,357,250; 4,382,007; 4,500,440; 4,640,788; 4,699,723; 4,71 5,975; 4,732,942; 4,764,304; 4,812,261; 4,816,172; 4,820,776; 4,842,756.

The OCP's have the ability to provide a high thickening contribution to the lubricating oil composition thus increasing the viscosity index of the overall composition. Thickening power is generally defined as the difference in the kinematic viscosity of a dilute solution of an OCP mixed with oil and the diluent oil. For example, an oil solution containing from 1 to 2 percent of an OCP which provides a thickening power of 6 to 7 centistokes measured at 100° C. generally indicates acceptable viscosity index improvement performance.

Within a class of structural similar polymers, the higher the molecular weight, the greater the viscosity it imparts to the lubricating oil. However, higher molecular weight polymers exhibit a greater tendency to breakdown under the shear and high temperature conditions normal in engine operation. This, of course, results in a loss in viscosity and the polymers are referred to as lacking in shear stability. Thus, a balance must be achieved between the thickening contribution of the polymer and its tendency to degrade. This shear stability is typically measured as a percent viscosity breakdown on shear under a standard set of conditions. A value below 30 percent viscosity breakdown in a polymer is shear stable as that term is understood in the art.

The composition of the linear ethylene-propylene copolymers can be adjusted so that an excellent balance can be achieved between thickening power and mechanical shear stability, however these compositions tend to have higher than desirable viscosity at very low temperatures. This is related to the ease of engine cranking during start-up in cold climates. The viscosity at low temperature of a lubricating oil composition is defined by the Cold Cranking Simulator (CCS) test, a viscosity under shear at generally −25° C. is measured. To achieve maximum performance under the CCS test blends of OCP's have been employed. See U.S. Pat. Nos. 3,697,429; 4,507,515; 5,391,617; and 5,451,630.

Hydrogenated star branched polymers have been proposed for improving the low temperature rheological properties of lubricating oil compositions. See U.S. Pat. Nos. 4,116,917; 4,141,847; 4,788,361; 4,557,849; 4,849,481; 4,156,673. These hydrogenated star polymers are prepared in the coupling of polymers from the anionic solution polymerization of conjugated dienes, which may optionally also contain monomeric units of a monoalkenyl aromatic hydrocarbon (vinylarenes), with a polyalkenyl coupling agent followed by hydrogenation.

These star polymers of dienes and optionally vinyl arenes have also been functionalized to enhance not only rheological properties of the diluent oil but other desirable multifunctional performance criteria such as disperancy and improved shear stability of the lubricating oil. Functionalization has been effected by direct copolymerization of a functional vinyl monomer followed sometimes by secondary chemical reactions, with for examples amines to obtain dispersant properties, carboxylation via metalization reaction with alkyl lithiums, and free radical grafting. See for example U.S. Pat. Nos. 4,141,847; 4,358,565; 4,409,120; 4,427,834; 4,868,245; 5,141,996; 5,147,570.

While star branched polymers of this type have excellent low temperature performance in lubricating oils, their application has been limited due to their high cost of manufacture. In addition, difficulty has been encountered in derivatizing these star polymers via the well-established techniques of grafting and amination known in the art.

In U.S. Pat. No. 5,030,695 there is purportedly described a technique for producing polyolefin star polymers. In one example, there is described nodular ethylene propylene copolymers in which ethylene, propylene and norbornadiene are copolymerized to form a nodular branched structure to which additional monomers are added to lengthen the nodular arms. Methylacrylate is then added to cap the arms. Another example purports to describe the reaction of a hydroxy terminated ethylene propylene copolymer which is then dissolved in a dry lubricating oil and reacted with a polyfunctional isocyanate (Desmodur R has three isocyanate groups per molecule). Neither reaction conditions of any kind nor any structural characterizations of the polymer are provided.

Hydrocarbon polymers, particularly polyisobutylenes, have been used recently in derivatized form to modify properties of fuels. A problem common to carburetors, the intake system of gasoline engines, and the injection systems for fuel metering in gasoline and diesel engines is contamination by impurities due to dust particles in the air, uncombusted hydrocarbon residues from the combustion chamber and crankcase vent gases passed into the carburetor. Intake deposits interfere with operation of the valves, such as closing, motion and sealing leading to sticking and eventually valve burning. These residues shift the air/fuel ratio during idling and in the lower part-load range so that the mixture becomes richer and the combustion more incomplete and in turn the proportions of uncombusted or partially combusted hydrocarbons in the exhaust gas becomes larger and the gasoline consumption increases.

Fuel additives which overcome these disadvantages are referred to as detergents. Generally, these are low molecular weight hydrocarbon polymers derivatized with polar groups. Typically detergents have been based on aliphatic hydrocarbylamines, particularly polyisobutylamines (see for example U.S. Pat. Nos. 3,438,757; 3,565,804; 3,574,576; 3,848,056; 3,960,515; 4,832,702; 4,173,456; 4,357,148; 4,877,416). While the simple polyisobutylamines have been successful in keeping valves and carburetors clean, they have shown little benefit as sludge dispersing agents. It is well-known in the art of lubricating oil additives that polyamine derivatives of hydrocarbon polymers particularly ethylene-propylene copolymer have excellent dispersant properties.

It is an object of the invention to provide fuel and lubricating oil additive compositions in the form of branched polyolefin polymers in which it is possible to control the composition of the branched polymer by controlling the degree of branching or number of arms coupled to the polymer backbone independent of control of the composition and molecular weight of the arms.

It is also an object of this invention to provide fuel additives in the form of polyolefin branched polymers derivatized with polyamines which function as detergent, dispersant additives.

Thus, there is further realized a need for low cost branched polymeric additives which provide a good balance of thickening efficiency and mechanical shear stability while affording a minimal low temperature viscosity to the lubricating oil composition.

It is a further object of this invention to provide a branched polyolefin polymer which can be functionalized using techniques known in the art.

SUMMARY OF THE INVENTION

The concepts of the present invention reside in the use in fuel and/or lubricating oil applications of an additive composition comprising a branched polyolefin polymer in the form of a comb, star, nanogel or structural combinations thereof, whereby a plurality of polyolefin arms are linked to a polymeric backbone to provide a highly branched structure in which the properties of the highly branched structure can be conveniently tailored to a single or multifunctional performance criteria of a fuel and/or lubricating oil composition.

The branched polyolefin polymers of the present invention rely on chemical reactions which afford the coupling or linking together of polyolefin prearms into combs, stars, nanogels or structural combinations thereof. Branched polyolefin polymer compositions of the present invention result from either a coupling reaction between a reactive polymeric backbone containing functionality capable of reaction with a polyolefin prearm or a polymerization reaction between polyolefin prearms derivatized for such polymerization reactions. By polyolefin prearm is meant a polyolefin polymer containing a carbon to carbon double bond in a terminating monomer unit or a polyolefin polymer derivatized, preferably at its terminus, so that it can react with a functional polymer or a difunctional polymerizable monomer. Use of a polyolefin prearm allows for control of the polyolefin composition independently of the reaction to form the branched polyolefin.

Reactive polymers useful as backbones are preformed polymers with a selectable number of functional groups or chemically reactive sites that will couple with the polyolefin prearm. Alternatively, the backbone is formed by a polymerization reaction using a polyolefin prearm first derivatized with a difunctional polymerizable monomer, either alone or in combination with another monomer copolymerizable therewith. Selective use of the polymeric backbone allows one to control the distribution of the polyolefin arms, thus controlling the degree of branching (number of arms) and the type of branchings, that is, comb, star, nanogel or combinations thereof.

The branched polyolefin polymers of the present invention thus can find use as single or multifunctional additives in fuel and/or lubricating oil applications because of the ability to control in independent chemical reactions both the composition of the arms and the backbone and the number of arms linked to the polymer backbone. Thus, the choice of the composition of the arms and the molecular weight of the arms will largely determine the properties of the branched polymer, such as whether it finds use in fuel or lubricating oil. The type of derivatization or functional groups introduced onto the arms will determine the extent of multifunctional additive use in either a fuel or lubricating oil.

DETAILED DESCRIPTION OF THE INVENTION

One of the advantages of the branched polyolefin polymeric additives of the present invention is the ability to provide a highly branched polymer structure that is achieved in part through the use, as the polymeric backbone, of a polymeric backbone structure. Polymeric backbones in the practice of this invention are preformed polymers having a known or selectable number of functional groups or chemically reactive sites that can be used to couple with the polyolefin prearm. Reactive polymeric structures useful as backbones are polymers possessing functionality which is either (a) capable of directly reacting with unsaturation contained in a polyolefin prearms or (b) capable of undergoing coupling reactions by which polyolefin prearms have been derivatized for a compatible reaction with the functional group on the reactive polymeric backbone. The reactive polymers provide a large numbers of coupling sites by which a large number of polyolefin prearms can be linked to the polymeric backbone to thus enable control of both the extent of branching and the type of branched structure. The prior art, teaching as it does the use of generally monomeric multi-functional nuclei, is incapable of providing these highly branched polymer structures.

Branched polymers of the present invention have polyolefin arms or branches comprised of homo and copolymers of ethylene and propylene, copolymers of ethylene and/or propylene with other 1-alkenes having 4 to 28 carbon atoms, and copolymer of ethylene and/or propylene with polyenes having 4 to 28 carbon atoms. By the term polyolefin prearm is meant a polyolefin polymer derivatized, preferably at its terminus, that is, within the terminating monomer unit, so that it can react with a reactive polymeric backbone or a difunctional polymerizable monomer. Derivatized as used herein likewise includes polyolefin polymers having terminal unsaturation, that is, the monomeric unit terminating any linear branch has a carbon to carbon double bond, C=C.

In the preferred practice of the present invention, the polyolefin prearm, preferably contains, prior to derivatization or coupling with a reactive polymer or a difunctional polymerizable monomer, terminal unsaturation. That unsaturation is either vinyl, vinylidene, or vinylene unsaturation. Terminal unsaturation is preferred in order to reduce the steric effects resulting from reaction between two polymeric molecules.

Polyolefins can be derivatized to serve as prearms for reaction with a reactive polymeric backbone or a difunctional monomer by many types of chemical reactions. Convenient examples of functional groups introduced to the polyolefin prearm to effect coupling include, but are not limited to carbon-to-carbon unsaturation in the form of vinyl, vinylidene and vinylene bonds, hydroxy, amino, peroxy, carboxylic acid, ester, halide, or anhydride, organoboron, cyano, isocyanato, carbon-carbon unsaturation that is polymerizable, thio, epoxy or aldehyde. Such derivatization methods will be presented in more detail as specific embodiments are defined.

Reactive polymer structures useful as backbones in the practice of this invention are very broad. Examples includes, but are not limited to the following classes: homo and copolymers of polyhydrosilanes, polyacrylic and methacrylic acids, polyacrylates, polymethacrylates, polyvinyl alcohol, polyvinyl acetate, poly(vinyl acetals), poly(vinyl ketals), ethylene copolymers with ethylenically unsaturated carboxylic acids, esters, or anhydrides, styrene copolymers with ethylenically unsaturated carboxylic acids, esters, or anhydrides, dendrimers, polythiols, polyepoxides, poly or extended isocyanates.

Use of a preformed reactive polymer as the backbone generally leads to a branched structure characterizable basically as a comb or star, depending to a significant degree on the molecular weight of the reactive polymeric backbone and the polyolefin prearms. Star branched polymers are those wherein the backbone exists as a radial core having attached to it the polyolefin arms. Examples of reactive polymeric backbones that will generate a star structure are dendrimers and extended isocyanates or alternatively any backbone with a cyclic or radial branched structure. Comb branched polymers are those wherein the polymeric backbone is essentially linear and the polyolefin arms extend pendant from that linear backbone. Thus, polyhydrosilanes, polymethacrylates, and ethylene copolymers are typical examples of reactive polymeric backbones that will provide a comb structure. Incorporation of a crosslinkable monomer during the coupling reaction can lead to a crosslinking of the comb or star structures via residual functionality on the backbone, thus generating a nanogel structure. The nanogel structure thus exists as a crosslinked core (crosslinkable monomer and backbone) with polyolefin arms attached to the core. Crosslinked centers and thus a nanogel structure also results from reactions between functionality internal to the polyolefin arms and a crosslinkable monomer. Regardless of preparation technique, the nanogel structure will function as a star branched polymer. For that purpose, use can be made of conventional crosslinking agents well known to those skilled in the art, including such crosslinking agents as (1) non-conjugated polyenes such as the α,ω-alkadienes like, 1,7-octadiene, 1,9-decadiene, divinyl cyclohexane, (2) cyclic polyenes like norbornadiene, vinyl norbornene, ethylidene norbornene, (3) divinyl aryl monomers like, divinyl naphthalene and divinyi benzene, (4) multifunctional silane monomers like, divinyl silane, tri and tetravinyl silanes, trialkoxysilanes, trihalosilanes, alkoxyhalosilanes, (5) α,ωdiamino alkanes like, 1,4-diaminobutane and 1,6-diaminohexane and (6) α,ω-dicarboxy-alkanes and-alkenes like succinic acid, maleic anhydride, adipic acid, terephthalic acid, etc.

In an alternative embodiment, the polymeric backbone is formed via a polymerization reaction between polymerizable monomers and polyolefin prearms that have been first derivatized with a difunctional polymerizable monomer leaving a polymerizable group capable of undergoing such polymerization reactions. Branched polymers thus formed will generally have comb structures. However, when the polyolefin prearm has a high molecular weight compared to the molecular weight of the backbone achieved during polymerization of the arms, the arms will fold to provide a physical star. In the event the polymerization reaction is carried out in the presence of a crosslinkable monomer a nanogel type structure will be formed. Thus, nanogel-type structures or a mixture of comb, star and nanogel will originate when combs and/or stars are further randomly branched by introduction of a crosslinkable monomer, as herein above described, during preparation of the backbone or during coupling prearms to the backbone.

The difunctional polymerizable monomer as used herein is a monomer possessing functionality that can selectively react with the terminal unsaturation or other terminal functionality of the polyolefin prearm, and possess other secondary functionality, reactive via a standard polymerization techniques such as cationic, anionic, free radical, Ziegler-Natta, etc., as a secondary reaction. Difunctional polymerizable monomers can be selected from the group comprising hydroalkoxysilanes, hydrohalosilanes, acrylic or methacrylic acids, their esters, amides, acid halides or anhydrides, vinyl acetate, vinyl alcohols, vinyl amines, vinylcyano compounds, vinyl isocyanates, vinyl thiols, vinyl epoxy compounds, etc.

The polyolefin prearms which can be used in the practice of the present invention depend in large measure on the properties desired in the branched polymer. In most embodiments, it is generally preferred, that the polyolefin prearm be formed of a polyolefin containing terminal unsaturation in the form of either vinyl, vinylidene, vinylene, or mixtures thereof. As polyolefin prearms use is made of generally homopolymers of ethylene and propylene and preferably ethylene propylene copolymers or copolymers of ethylene and/or propylene with other 1-alkenes, as well as copolymers formed by the interpolymerization of ethylene, 1-alkenes and at least one other polyene monomer. Such polymers are themselves well known to those skilled in the art and are typically prepared by using conventional Ziegler or metallocene polymerization techniques well known to those skilled in the art. In addition, it is also possible to use, in combination with one or more of the monomers described above, one or more polyenes which either may or may not be functionalized. Also suitable as comonomers in the formation of the polyolefin prearms are functionalized ethylenically unsaturated monomers in which the functional group may be one or more polar groups, the ethylenic unsaturation capable of undergoing metallocene catalyzed polymerization.

As will be appreciated by those skilled in the art, while propylene is a preferred monomer for copolymerization with ethylene and optionally a diene monomer, it will be understood that in place of propylene, use can be made of other 1-alkenes containing 4 to 28 carbon atoms. The use of such higher 1-alkenes together with or in place of propylene are well known to those skilled in the art and include, particularly, 1-butene, 1-pentene, 1-hexene, and 1-octene.

When using an interpolymer of ethylene, 1-alkene and a polyene monomer, use can be made of a variety of polyene monomers known to those skilled in the art containing two or more carbon-to-carbon double bonds containing 4 to 28 carbon atoms, including non-cyclic polyene monomers, monocyclic polyene monomers and polycyclic polyene monomers. Representative of such compounds include alkylidienes such as 1,4-hexadiene and 7-methyl-1,6-octadiene, α,ω-alkadiene such as 1,7-octadiene and 1,9-decadiene, dicyclopentadiene, bicyclo(2,2,1)hepta-2,5-diene, commonly known as norbornadiene as well as the alkenyl norbornenes wnerein the alkenyl group contains 1 to 20 carbon atoms and preferably 1 to 12 carbon atoms. Examples of some of the latter compounds includes 5-methylene-2-norbornene, 5-ethylidene-2-norbornene, vinyl norbornene as well as alkyl norbornadienes.

As known to those skilled in the art, it is also possible to include with certain Ziegler-Natta catalyst systems, as a comonomer in the polymerization of the polyolefin prearm, a small amount, typically up to 10 percent, of a functional ethylenically unsaturated monomer. Such monomers typically contain 2 to 20 carbon atoms and contain an ethylenically unsaturated group. Preferred functional ethylenically unsaturated monomers include acrylate and methacrylate esters wherein the ester group is $C_2$ to $C_{20}$ alkyl or $C_6$ to $C_{25}$ aryl including substituted aryl, vinyl amines, vinylcyano compounds and vinyl esters. Representative of suitable functional monomers which can be used in the practice of the present invention include methylmethacrylate, methylacrylate, N-vinylamine, N-vinylpyridine, acrylonitrile, vinyl acetate, etc.

In a particular practice of the present invention, the polyolefin prearm is produced using metallocene catalysts. As used herein, the term "metallocene catalyst system" refers to and includes the use of a transition metal compound comprising a metal such as titanium, zirconium, chromium, hafnium, yttrium containing at least one coordinating ligand that is a highly conjugated organic compound (e.g., cyclopentadienyl or indenyl). Such catalyst systems are themselves known and are described in the following published applications, the disclosures of which are incorporated herein by reference: EP-A-347,129; EP-A-69,951; EP-A-468,537; EP-A-500,944; PCT/WO/93/00229; PCT WO96/13529; U.S. Pat. Nos. 5,017,714; 5,055,438; 5,064,802; 5,091,352; 5,120,867; 5,132,262; 5,171,799; 5,206,197; 5,281,679; 5,296,433; 5,321,106; 5,329,033; 5,374,752; 5,391,789; 5,441,920. In addition, other Ziegler catalyst systems likewise known in the art as producing terminal unsaturation can likewise be used in the practice of this invention. One such example is titanium chloride supported on magnesium chloride and used in high temperature (greater than 100° C.) polymerization systems. Another example is the copolymerization of ethylene with higher 1-alkenes using $VOCl_3$ and diethylaluminum chloride. In general, the choice of catalyst system and polymerization conditions will depend on the specific type of polyolefin prearm desired, as known to those skilled in the art of Ziegler-Natta polymerization technology. Thus, the composition of the arms are dependent on the limits of Ziegler-Natta polymerization technology and can be controlled independent of the composition of the backbone.

Because the concepts of the present invention make it possible to introduce in a controlling fashion large numbers of polyolefin prearms, the properties of the polyolefin arms linked to the polymeric backbone dominate the properties of the resulting branched polymer. Thus, the molecular weight of the polyolefin prearms can be varied to control the properties desired in the overall branched polymer. Similarly, the method of preparation of the polyolefin prearms can be used to, in part, control over the properties of the arms. In general, the lengths of the prearms, expressed as the number-average molecular weight in units of g/mole, Mn, can be varied within broad limits, depending on the properties desired. As a general rule, use is made of polyolefin prearms having a Mn between 100 and 100,000, and preferably between 300 and 80,000. Likewise, the weight average molecular weight in units of g/mole, Mw, of the prearms can be varied within the limits of 200–250,000. It is generally preferred that the molecular weight distribution (MWD) of the prearms be controlled to a level of at least 1.5, referring to the ratio between the weight-average molecular weight (Mw) and the number-average molecular weight (Mn) as determined by size exclusion chromatograph-differential viscometry (SEC-DV). Preferred prearms used in the practice of the present invention have a MWD of at least 1.5 ranging up to 3.5. In some specific embodiments use is to be made of blends of polyolefin prearms having different molecule weights and MWD's, so that, the mixture may appear to have a very broad MWD, often at least 4.0 and above.

Polyolefin branched polymers useful as additives in fuel compositions will be prepared from polyolefin prearms having a Mn of 100 to 5000, and preferably from 300 to 3000. The MWD of the prearm can range from 1.5–3.5 depending on the method of preparation of the prearm and the desired fuel additive property.

Polyolefin branched polymers useful as additives in lubricating oil compositions will be prepared from polyolefin prearms having a Mn of 1000 to 100,000 and preferably between 2000 to 80,000. For use as a dispersant additive in lubricating oil, the desirable Mn range is 1000–10,000. The MWD can vary from 1.5 to 3.5 and typically 1.8–2.5 depending on the mode of preparation of the prearm.

The chemical reactions employed in the practice of this invention to couple the polyolefin prearm with the reactive polymer are generally known. Reaction times will generally be much longer in the practice of this invention than that practiced for the same chemical reaction with conventional monomeric chemicals.

As will be appreciated by those skilled in the art, as the molecular weight of the polyolefin prearm to be coupled with the backbone increases in molecular weight, the number of terminal double bonds in the polyolefin prearm decreases on a weight basis. That in turn results in a reduction of the coupling efficiency of the polyolefin prearms to the polymeric backbone. Thus, longer reaction times are required to produce the branched polymer of the invention. Similarly, steric factors can play a role in reducing the coupling efficiency, making it more difficult to couple the polyolefin prearm to adjacent functional groups in the backbone.

In short, the greater the molecular weight of the polyolefin prearm to be coupled with the backbone, the greater is the reaction time in affecting that coupling and the less complete is the substitution of the polyolefin prearm on the functional groups of the backbone.

The number of repeating units with functionality capable of being coupled to a plurality of polyolefin prearms depends, to some degree, also on the intended application of the polymer. As a general rule, it is preferred that the reactive polymeric backbone contains at least 10 functional groups through which polyolefin prearms can be linked to form a highly branched structure. For use as fuel or lubricant additive composition, it is often desirable to employ a reactive polymeric backbone having the capability of forming at least 3 to 100 polyolefin arms linked to the polymeric backbone. For use in lubricating oil applications, particularly as a multi-purpose viscosity index improver, it is generally preferred that the branch polyolefin additive have 4 to 50 polyolefin arms. Correspondingly, for use in fuels, branched polyolefin additives with 3–40 arms are preferred.

While it is generally preferred, as indicated above, that the reactive polymer backbones contain at least 10 functional groups through which the polyolefin prearms can be coupled, it is necessary in most embodiments that the reactive polymeric backbone contains at least ten functional groups. That is so because, in most of the embodiments of this invention, the reaction to couple the polyolefin prearm to the reactive polymeric backbone is not quantitative with respect to utilization of backbone functionality. As explained above, the molecular weight of the polyolefin prearm can reduce the coupling efficiency of high molecular weight polyolefin prearms to the reactive polymeric backbone; that effect is often reinforced by steric factors associated with the coupling site on the reactive polymeric backbone and can prevent, with higher molecular weight polyolefin prearms, the coupling of polyolefin prearms to immediately adjacent functional groups in the polymeric backbone. In those embodiments in which it is possible to couple lower molecular weight polyolefin prearms the coupling reaction will proceed in a quantitative or substantially quantitative manner, and higher branched polymers can be produced with the use of only 6 to 10 functional groups in the reactive polymeric backbone. In those embodiments in which a very low molecular weight reactive polymeric backbone is employed quantitative or substantially quantitative coupling can be achieved regardless of the molecular weight of the polyolefin prearms. In embodiments where very low molecular weight, Mn less than 5000, polyolefin prearms are coupled to form fuel additives, the reactive polymeric backbone must have at least 3 functional groups capable of undergoing a coupling reaction with polyolefin prearms. Additionally, in embodiments where the reactive polymeric backbone exists as a branched structure, for example, dendrimers or extended isocyanates, quantitative or substantially quantitative coupling can be achieved regardless of the molecular weight of the polyolefin prearm.

The choice of reactive polymeric backbone and specific functionalized polyolefin prearm is dependent on the specific use as a fuel or lubricant additive composition as well as whether the actual end use will require the additive to possess multifunctional properties. Polyolefin prearms and reactive polymeric backbones are chosen so that the chemical bond coupling them will be stable under the conditions of intended use.

One suitable class of polymeric backbones used in the practice of the present invention are polyhydrosilane polymers and copolymers containing a large number of repeating units containing a silicon-hydrogen bond. In general, it is preferred to use silicon-containing polymers having repeating units of the general formula:

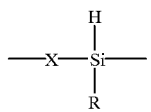

wherein X is a heteroatom, such as O, S, N, Si or one or more carbon atoms either as part of an aliphatic or aromatic group and R is hydrogen or an organic group, and preferably hydrogen, alkyl, aryl, cycloalkyl, alkoxy, aryloxy or cycloalkoxy.

Illustrative are polyhydrosiloxanes derived from an alkylhydrosiloxane end-capped with either a hydrosilane functionality or an alkylsilane functionality. Such siloxanes have the general formula:

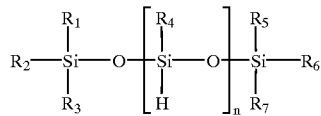

wherein $R_1$ to $R_7$ is each independently hydrogen or an organic group; preferably, $R_1$ and $R_2$ can be either alkyl, aryl or cycloalkyl; $R_3$ can be either hydrogen, alkyl, aryl, cycloalkyl, alkoxy, aryloxy or cycloalkoxy; $R_4$ is hydrogen, alkyl, aryl, cycloalkyl, alkoxy, aryloxy or cycloalkoxy; $R_5$ and $R_6$ are alkyl, aryl, cycloalkyl, alkoxy, aryloxy or cycloalkoxy and $R_7$ is hydrogen, alkyl, aryl, cycloalkyl, alkoxy, aryloxy or cycloalkoxy; n is an integer having a minimum value of about 10, and preferably 25 or higher. Such polyhydrosiloxanes, as is well-known to those skilled in the art, are commonly available from a number of companies including Dow Corning and Rhone Poulenc.

As will also be appreciated by those skilled in the art, it is also possible to use, as the reactive polymeric backbone, siloxane copolymers containing 10 or more and typically 10 to 80 silicon-hydrogen groups as repeating units. As will also be appreciated by those skilled in the art, it is likewise possible to employ in place of the siloxanes described above, the corresponding analogs thereof in which the oxygen atom is replaced by sulfur or nitrogen atoms. Representative of suitable polyhydrosilane polymers are polymethylhydrosilane, polymethylhydrosiloxane, methylhydrodimethylsiloxane copolymer, methylhydrophenylmethylsiloxane copolymer, methylhydrocyanopropylsiloxane copolymer, methylhydromethyloctylsiloxane copolymer, poly(1,1-dimethylsilazane), poly(1,2-dimethylsilazane), (1-methylsilazane)(1,2-dimethylsilazane) copolymer and methylhydrocyclosiloxane polymer (a cyclic reactive polymeric backbone).

In general, use is made of silicon-containing polymer backbone having a number average molecular weight of 300 or higher, and preferably 300 to 10,000.

In accordance with a preferred embodiment of the invention, the prearms can be linked to the silicon-containing reactive polymeric backbone described above by reacting its terminal unsaturation with the Si—H bond present in repeating units in the polysilane backbone. As is well known to those skilled in the art, the reaction between the terminal unsaturation of the pre-arms and the Si—H bond of the polysilane can be carried out under conditions of heat. It is generally preferred to carry out the hydrosilylation reaction under the influence of a suitable catalyst to effect addition of the silicon hydride across the terminal unsaturation of the olefin prearm to link the arm to the silicon-containing reactive polymeric backbone. Suitable hydrosilylation catalysts to effect that reaction are known in the art and include metals from groups 8 to 10 of the Periodic Table of the Elements, (in Handbook of Chemistry and Physics 70th edition, CRC press, 1989–90), including catalysts based on palladium, platinum or nickel. Catalysts which have been found to be particularly effective are $H_2PtCl_6 \cdot xH_2O (x \geq 0)$, $K[Pt(C_2H_4)Cl_3]$, $RhCl(PPh_3)_3$ or $Co_2(CO)_8$. Such catalysts and their use are described in the literature such as Lukevics et al. in J. Organomet. Chem. Lib. 1977, 5, pages 1–80.

The reaction can be carried out in accordance with a variety of reaction conditions as described in the art. It is generally possible, and sometimes desirable, to carry out the reaction in the presence of a solvent such as aliphatic hydrocarbons such as pentane, hexane, heptane, pentamethylheptane or distillation fractions; aromatic hydrocarbons such as benzene or toluene; halogenated derivatives of aliphatic or aromatic hydrocarbons such as tetrachloroethylene or ethers such as tetrahydrofuran or dioxane. The relative properties of the prearm and the polyhydrosilane are controlled to ensure that the desired number of polyolefin prearms become linked by the addition reaction to the polymeric backbone. The solution reaction is generally carried out at a concentration of 2 to 50 weight percent of polymeric reactant. The polymeric reactants are ratioed according to the moles of terminal unsaturation (C=C) in the polyolefin prearm to the moles of Si—H bonds in the polyhydrosilane. Because the coupling of polyolefin prearms to the hydrosilane groups present in the backbone controls the number of arms linked to the backbone, a molar excess of polyolefin prearms ensures the maximum number of polyolefin arms linked to the polymer backbone, when maximum branching is desired. In general, mole ratios ranging from 1:100 to 10:1 of the polyolefin prearms per mole of hydrosilane group is employed.

The reaction temperature is not a critical variable, and depends somewhat on the reactants used in carrying out the coupling reaction. Generally, temperatures ranging from 15° to 300° C. can be used for that purpose. Similarly, the reaction time is likewise not critical and depends on the reactants employed. As a general rule, reaction times are those sufficient to couple the polyolefin prearm to the polymer backbone, and generally range from 10 seconds up to 300 hours.

As will be appreciated by those skilled in the art, the foregoing reaction generates a mixture of products, depending precisely on the structure of the polymer backbone and the structure of the polyolefin prearm. Nonetheless, one of the principal reactions which proceeds is the addition of the hydrosilane group across the terminal unsaturation of the polyolefin prearm. For example, those prearms containing terminal vinylidene unsaturation react according to the following equation:

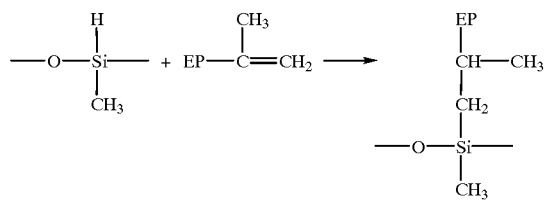

while terminal vinyl unsaturation proceeds according to the following equation:

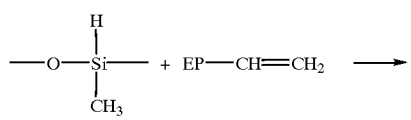

-continued

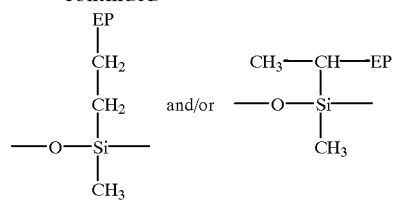

wherein EP represents the remainder of the polyolefin prearm.

In accordance with one variation on this embodiment of the invention, it is also possible to produce polymers of the same type by a different route in which the polyolefin prearm is reacted with a difunctional polymerizable monomer in the form of a simple monomeric silane compound containing the Si—H group which is then either homopolymerized or copolymerized with other silicon-containing compounds in a conventional manner. This concept of the invention thus involves the coupling of a polyolefin prearm with a monomeric hydrosilane having the structure:

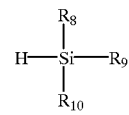

wherein $R_8$ and $R_9$ are each a hydrolyzable group such as a halogen atom and preferably chlorine or a lower alkoxy group containing 1 to 6 carbon atoms and $R_{10}$ is a readily hydrolyzable group as described above or hydrogen, alkyl, aryl or cycloalkyl.

Thus, the reaction, when the polyolefin prearm contains vinylidene terminal unsaturation, proceeds as follows:

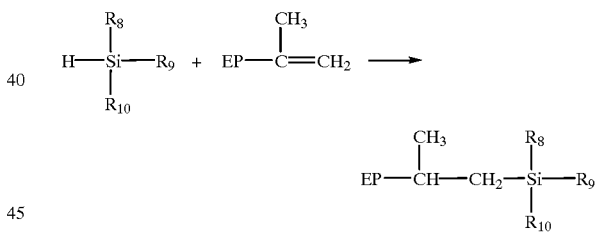

The resulting polyolefin-terminated silane can then be reacted, typically in the presence of water, to homopolymerize the silane and form the corresponding branched polymer containing polyolefin arms and a siloxane polymer backbone. It should be understood, however, that it is possible, and sometimes desirable, to utilize silanes different from that with which the polyolefin prearm is coupled which then can be copolymerized to form a polysilane backbone structure, having a random distribution of polyolefin arms emanating therefrom.

Optionally, if a nanogel type of branched polyolefin is desired, one would add to the reaction sequence just described a small amount of a crosslinking monomer in the form of a trialkoxysilane, a trihalosilane, an alkoxyhalosilane multi-functional silylamines and amides, etc. so that the heteroatoms of one monomer react with the heteroatom attached to —Si— of another monomer to form a hydrophilic core of Si— heteroatom groups with polyolefin arms attached thereto. As will be appreciated by those skilled in the art, the terminally unsaturated polyolefin prearm can be reacted directly with the crosslinking monomer in the presence of water to form a nanogel branched polymer.

It is also possible to copolymerize, with the polyolefin-substituted silane, other hydrolyzable silanes to form a siloxane copolymer backbone, the units of which contain polyolefin arms emanating therefrom along with repeating units from the other hydrolyzable silanes which have been copolymerized therewith. For example, it is possible to copolymerize a polyolefin-substituted silane illustrated above with, for example, dimethyldichlorosilane in which some of the repeating units of the polymer backbone contain polyolefin arms emanating therefrom while others derived from the dimethyldichlorosilane contain methyl groups appended to the silicon atom.

The conditions under which the polyolefin prearm is reacted with the hydrosilane monomer are like those described above for reaction between the polyolefin prearm and the polyhydrosilane.

In accordance with another concept of the present invention, it is possible to utilize other chemical reactions or coupling techniques to link the polyolefin prearm to a reactive polymer. In accordance with one embodiment, it is possible to employ, as the reactive polymeric backbone, polymers of acrylic and methacrylic acid either as a homopolymer or copolymerized with other acrylic and/or methacrylic type monomers. The acrylic and methacrylic polymers used in this embodiment of the invention are those derived from the monomeric unit having the structure:

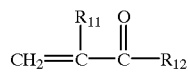

wherein $R_{11}$ is either hydrogen or lower alkyl ($C_1$–$C_{12}$ alkyl) and $R_{12}$ is an OH group, a halogen group and preferably chlorine, an alkoxy group, or an aryloxy group. Representative of such compounds include acrylic acid, methacrylic acid, acrylyl chloride and methacrylyl chloride along with various esters of either acrylic or methacrylic acid including the alkyl and aryl ester derivatives of the two acids. As a comonomer use can be made of amino or hydroxyalkyl acrylates and methacrylates. It is sometimes desirable to employ, when using the ester, an ester leaving group to facilitate transesterification with a functionalized polyolefin prearm as will be described more fully hereinafter. Suitable ester-leaving groups are well known to those skilled in the art, and include tosylates and mesylates as examples.

The polyacrylic or polymethacrylic backbone embodied in the practice of the present invention should have a molecular weight sufficient to provide at least 10 and preferably at least 25 acid, acid chloride or ester groups in each backbone polymer chain. Such polymers have molecular weights Mn typically ranging from 1,000 to 40,000.

The coupling of the polyolefin prearm to the acid, acid chloride or ester functionality of the reactive polymeric backbone can be achieved by first functionalizing the polyolefin prearm prepared as described above to introduce either a terminal amine group or a terminal hydroxy group, each of which is capable of undergoing reaction with the functional group contained in the polyacrylic or polymethacrylic backbone. Preferably, the hydroxy terminal polyolefin prearm is converted to a lithium alkoxide by reaction with n-butyllithium, followed by reaction with acrylyl chloride or methacrylyl chloride.

One such technique for converting the terminal unsaturation of the polyolefin prearm to either an amine or a hydroxy compound is by hydroboration. In that technique, a hydroboration reagent is added across the terminal double bond of the polyolefin prearm to form an organoborane derivative which can then be converted to the corresponding hydroxy compound using alkaline hydrogen peroxide or to the corresponding amine using ammonium chloride. Those reactions can be illustrated by means of the following equation:

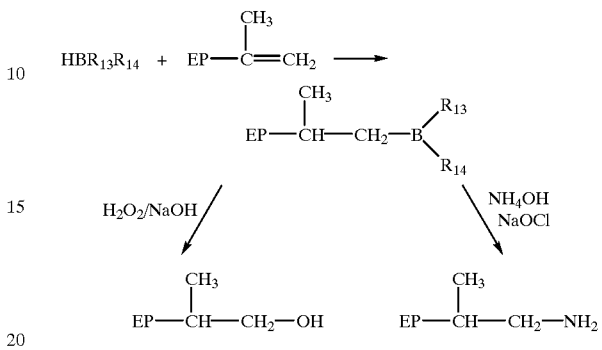

wherein $R_{13}$ and $R_{14}$ are each hydrogen and/or organic groups bonded to the boron in the hydroboration reagent. A number of such hydroboration agents are well known to those skilled in the art and can be found and their utility described in H. C. Brown, "Organic Synthesis Via Boranes" Wiley 1975. One such hydroboration reagent which can be effectively used in the practice of the present invention is 9-boronbicyclo-[3.3.1]nonane [9-BBN].

Once converted to the corresponding hydroxy or amine terminated polyolefin prearm, this prearm can then be reacted with the polyacrylic or polymethacrylic backbone in accordance with conventional techniques by which the functional group of the reactive polymer, a carboxylic acid group, an acid chloride group or an ester group reacts with the polyolefin prearm in the form of a hydroxy terminated compound to form the corresponding ester polyolefin arms linked to the acrylic or methacrylic polymer backbone. Similarly, the same functional groups react with an amine terminated pojyolefin prearm to form the corresponding amide, thereby linking the polyolefin arm to the polymer backbone. Conventional esterification and amidation reaction conditions, generally in solvent, may be used to effect that coupling reaction.

Instead of using, as the polymer backbone, homopolymers of acrylic or methacrylic acid, acid chlorides or esters, use can be made, in accordance with another embodiment of the invention, of copolymers of the foregoing acrylic or methacrylic acids, acid chlorides or acid esters. Such copolymers are formed from one or more polymerizable ethylenically unsaturated monomers capable of undergoing an anionic or free radical polymerization. Preferred among comonomers with such acrylic and methacrylic monomers as described above are ethylene and lower 1-alkene such as propylene and 1-butene, styrene and styrene derivatives such as alpha methylstyrene, vinyl ethers and vinyl cyano compounds such as acrylonitrile and methacrylonitrile. Other comonomers useful in the practice of this invention as copolymerizable with the acrylate and methacrylate monomers include unsaturated diacids, diesters, anhydrides such as fumeric, itaconic, maleic, a broad range of vinyl monomers such as vinyl acetate, vinylimidizole, vinyl pyridine, methyl vinyl ketone, allyl glycidyl ether, and acrylamide. The amount of one or more of the foregoing comonomers is not critical and can be varied within relatively wide ranges. In general, use can be made of 20 to 80 percent of the acrylic or methacrylic monomer and 20 to 80 percent of one or more of the foregoing comonomers. Once again, it is preferred to employ, as the polymer backbone, copolymers having molecular weights (Mn) ranging from 1,000 to 40,000.

As will be appreciated by those skilled in the art, the polyolefin prearm can be coupled to such copolymers in the same manner as they are coupled to the acrylic and methacrylic homopolymers as described above. In either case, use is made of a molar ratio of the functionalized polyolefin prearm to acid, acid chloride or ester functionality or the reactive polymeric backbone to ensure the desired number of arms coupled to the backbone; this ratio is in the range of 1:100 to 10:1.

Branched polymers of the foregoing types can also be prepared by the alternate route in which the terminal amine, hydroxy, or lithium alkoxy functional polyolefin prearm is first reacted with a difunctional polymerizable monomer. In this embodiment, it is convenient to use an acrylic or methacrylic monomer to couple the polyolefin prearm through either an ester or amide coupling linkage. Once coupling of the polyolefin prearm is accomplished, the resulting coupled monomer can then be subjected to conventional free radical or anionic polymerization either alone or in combination with one of the foregoing comonomers to form the corresponding polymers with polyolefin arms emanating from the repeating units derived from the acrylic or methacrylic monomer. Particularly, ethylene glycol dimethacrylate which leads to secondary coupling of the comb structures can be used to give a nanogel type branched polyolefin. Once again, the reaction techniques for effecting that polymerization reaction are conventional and can be found in the literature describing conditions to effect free radical and anionic polymerization of acrylic and methacrylic monomers. See, for example, the Encyclopedia Of Polymer Science & Engineering, (1988), John Wiley & Sons, Inc., Vol. 13, pp. 1702–1867 and Vol. 1, pp. 221–224, 235–251 (Bamford).

In accordance with another embodiment of the invention, use can also be made of a reactive polymer in the form of copolymers of maleic anhydride and ethylene or copolymers of maleic anhydride, ethylene and one or more of a lower alpha-olefins such as propylene and 1-butene or styrene. In accordance with this concept of the invention, use can be made of copolymers containing 85 percent to 95 percent of ethylene and 5 percent to 15 percent of maleic anhydride. The polyolefin prearms, which have been functionalized to introduce either a hydroxy or an amine group can thus be coupled to the ethylene/maleic anhydride copolymer by means of ester and/or amide linkages. Alternatively, when using polyolefins functionalized with an amine, it is also possible to couple the polyolefin prearm to the ethylene maleic/anhydride copolymer backbone by means of imide linkages. The reaction of an amine-functionalized polyolefin prearm with an ethylene/maleic anhydride copolymer to form the corresponding imide may be represented by the following equation:

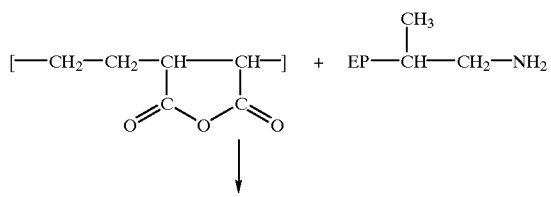

-continued

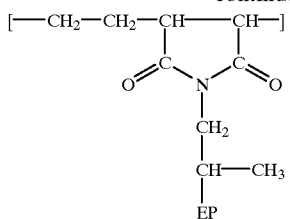

Once again, the reaction conditions for coupling hydroxy or amine functionalized polyolefin prearms are conventional.

As an alternative to the ethylene/maleic anhydride copolymers, use can also be made of the styrene/maleic anhydride copolymers, referred to as SMA polymers. Included as SMA polymers are those where the styrene in part may be substituted by other aryl olefins such as α-methyl styrene, vinyl naphthalene, alkyl styrenes, vinyl alkyl naphthalenes, halogen substituted styrenes, etc. In accordance with this concept of the invention, use can be made of copolymers containing 90 to 65 weight percent of styrene and 10 to 35 weight percent of maleic anhydride. Additionally, 5 to 15 weight percent of the maleic anhydride may be prereacted with simple amines such as ammonia, aniline, N-alkyl amines, alkyl substituted anilines to.form the corresponding maleimide group in the SMA polymer. The SMA polymers useful in the practice of this invention can have a Mn of 500 to 55,000. Polyolefin prearms, which have been functionalized to introduce a terminal hydroxy or amine group, can thus be coupled to the SMA polymers through coupling with the maleic anhydride groups to form an ester, amide, or imide linkage as described previously for the ethylenelmaleic anhydride backbone.

Branched polymers similar to those just described can be prepared by use of α,β-unsaturated anhydrides such as maleic anhydride as a difunctional polymerizable monomer for reaction with amine or hydroxy terminal polyolefin prearms. The amine or hydroxy groups react to provide new unsaturated polyolefin prearms with either an imide or an anhydride, ester bond. The unsaturation in the new prearm can be subjected to conventional free radical or anionic polymerization conditions either alone or with ethylene or styrene, to make copolymer backbones. Alternatively, other monomers copolymerizable with ethylene and/or styrene, for example acrylates and methacrylates, can be used to make a terpolymer backbone.

In accordance with a further embodiment of the invention, it is possible, and sometimes desirable to use, as the reactive polymeric backbone, partially hydrolyzed polymers of vinyl acetate. As is well known to those skilled in the art, vinyl acetate can be polymerized by means of a free radical polymerization mechanism to form polyvinyl acetate which can then be substantially or completely hydrolyzed using either acidic or basic conditions to remove acetyl groups pendant on the polymer backbone leaving pendant hydroxy groups. Typically, polyvinyl acetate can by hydrolyzed to the extent of 50 to 80 percent in the practice of the present invention. Thus, the polymer employed as the polymer backbone contains 50 to 80 percent alcohol groups and 20 to 50 percent vinylacetate groups. Such products are commercially available from a variety of sources.

In one variation, the vinyl acetate-vinyl alcohol polymer employed as the reactive polymeric backbone in the practice of the present invention can be converted by reaction with a $C_1$–$C_4$ aliphatic aldehyde or ketone to form the corresponding acetal or ketal, respectively. Such reactions and the polymers produced therefrom are well known to those skilled in the art and are commercially available from a variety of sources. Such polymers are referred to as poly (vinyl acetals) or poly(vinyl ketals) and generally contain the structure:

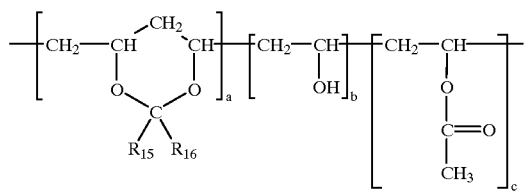

wherein $R_{15}$ and $R_{16}$ are each hydrogen or $C_1$–$C_{10}$ alkyl (e.g., methyl, ethyl, etc.). Commercially available poly(vinyl acetals) and poly(vinyl ketals) typically contain 75 to 95 percent by weight of the acetal (or ketal) (a), 6 to 25 percent by weight of vinyl alcohol (b) and 0 to 13 percent by weight of vinyl acetate (c). Those proportions are not critical to the practice of the present invention and, as will be appreciated by those skilled in the art, proportions outside those ranges can likewise be employed. While it is not critical to the practice of the invention, it is generally preferred that the polymer backbone used in this embodiment have number average molecule weight Mn ranging from 1,000 to 40,000.

The polyolefin prearm herein can be coupled to polyvinyl alcohol/vinyl acetate or to poly(vinyl acetals/ketals) in combination with either the vinyl alcohol group or the vinyl acetate group by means of a variety of techniques. For example, use can be made of a polyolefin prearm which has been functionalized to introduce a carboxylic acid group as described above or the acid chloride group. When the polyolefin prearm has been functionalized in that way, the carboxyl group is capable of reaction with either the hydroxy functionality of the vinyl alcohol by way of an esterification reaction or with an acetate group of vinyl acetate by way of a transesterification reaction in accordance with conventional techniques.

Alternatively, use can be made of a polyolefin prearm which has been functionalized to introduce an ester group, such as a simple aliphatic ester or, as is sometimes preferred, an ester containing an ester leaving group such as a tosylate group or mesylate group. Such ester groups are likewise capable of reaction with either the acetate functionality or the hydroxy functionality of the reactive polymeric backbone, again in accordance with well known techniques.

Another technique by which the polyolefin prearm can be coupled to the polyvinyl alcohol/acetate backbone is by a reaction sequence employing a hydroxy functional polyolefin prearm. The terminal hydroxy group of the polyolefin prearm is converted to a tosylate by reactions with tosylchloride to generate a terminal tosyl group on the polyolefin prearm. That has the capability of reacting directly with the hydroxy functionality of the polyvinyl alcohol/acetate in the backbone to form the corresponding ether linkage or to undergo a transesterification reaction with the acetate group to form the corresponding ester linkage.

In accordance with yet another embodiment of the invention, use can also be made, as the reactive polymeric backbones, of the polymeric structures known in the art as dendrimers. Such dendrimers are described in, for example, U.S. Pat. Nos. 4,587,329 and 4,737,550 and PCT published application Nos. WO93/14147 and WO95/02008, the disclosures of which are incorporated herein by reference. Dendrimers are three-dimensional highly branched polymer molecules comprising a core, and radiating from the core molecule a number of generations or branches. The generations of branches are composed of repeating structural units linked via various functional groups and terminated in the final generation by a functional group.

As is described in the foregoing patents, dendrimers are macromolecules formed with the aid of alternate reaction steps, starting from a core or an initiator core. Typically, the reactions occurring during the synthesis of such dendrimers are virtually selective reactions; that means that no or virtually no undesired side reactions occur.

In the preferred practice of the invention, the core molecule is a molecule which preferably contains two or more functional groups, (that is, it may undergo two or more chemical reactions) and may range as high as ten or more functional groups. The core may be chosen from the group of ammonia, water, methanol, polymethylenediamines, diethylenetriamine, diethylenetetramine, tetraethylenepentamine, linear and branched polyethylene imine, methylamine, hydroxyethylamine, octadecylamine, polyaminoalkylarenes, such as 1,3,5 tris(aminomethyl) benzene, tris(aminoalkyl)amines, such as tris(aminomethyl) benzene, tris(aminoalkyl)amines, such as tris(aminoethyl) amine, heterocyclic amines, such as imidazolines and piperidines, hydroxyethylaminoethylamine, mercaptoethyl amine, morpholine, piperazine, pentaerythritol, sorbitol, mannitol, duleitol, inositol, polyalkylenepolyols, such as polyethylene glycol and polypropylene glycol, glycols, such as ethylene glycol, 1,2-dimercaptoethane, polyalkylene polymercaptans, phosphine, $\epsilon$-aminocaproic acid, glycine, thiophenols, phenols, melamine and derivatives thereof, such as melamine tris(hexamethylenediamine). In the process according to the invention, use is preferably made of a core that is chosen from the group comprising polymethylene diamines, glycols and tris(1,3,5-aminomethyl)benzene (AEB). Polymethylenediamines, that are more preferably used as a core are hexamethylenediamine, ethylenediamine and 1,4-diaminobutane (DAB).

If so desired, it is also possible to use a copolymer containing the above functional groups as a core for the dendritic macromolecule. Examples of such copolymers are styrene-maleimide copolymer, polyethyleneimine and polymers such as polypropylene oxide, polystyrene and ethylene-propylene-diene copolymers that are functionalized with one or more of the above functional groups, such as $NH_2$ groups.

The core molecule is thereafter reacted with a polyfunctional compound, and preferably a polyfunctional compound which, when reacted with the core molecule, forms a dendrimer having either terminal amine groups, terminal hydroxy groups or other terminal functional groups such as alkylester groups. Thus, the dendrimer generations preferred for use in the practice of the present invention utilize, as the repeating unit, polyether, polyamidoamines, polyethyleneimines or polyalkylene-polyamines. One typical example of a dendrimer is formed with ammonia, as the core molecule. Ammonia is reacted, via a "Michael addition", with an excess of the polyfunctional compound methylacrylate, thus:

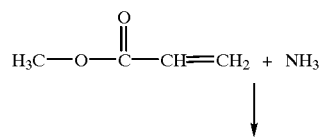

-continued

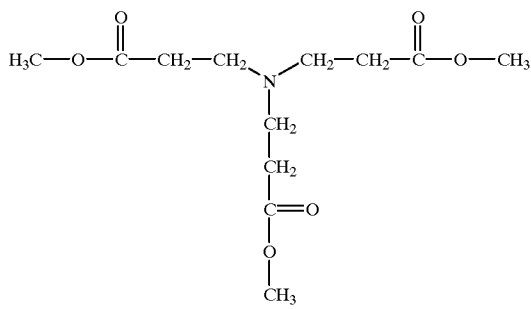

The foregoing structure is then next reacted with a polyfunctional compound such as an alkylenediamine to yield the following structure to form a polyamidoamine, thus:

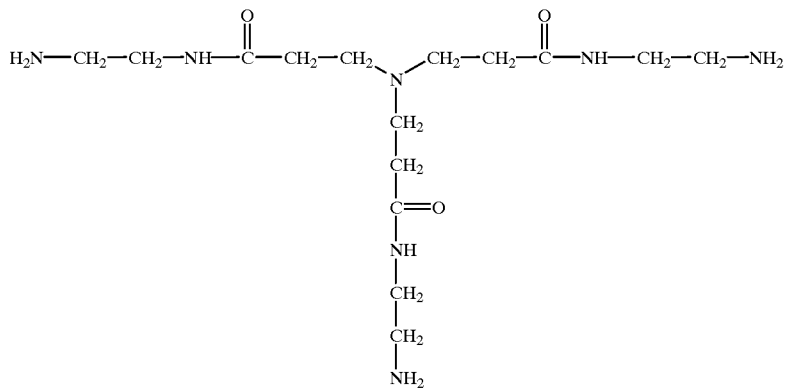

The above reaction sequence represents one generation.

Each generation thereafter is added by alternating reactions of methylacrylate and ethylenediamine. If desired the polyfunctional compound can be changed at any point in the sequence to vary the structure being produced or alternatively the reaction sequence can be stopped at a half generation.

In general, use is made, as the polyfunctional compound, of a wide variety of compounds capable of reaction with the core in the ordered sequence outlined above. Polyfunctional groups which may be employed in the practice of the present invention are generally known in the prior art. For example, as described in U.S. Pat. No. 4,587,329, there is described polyfunctional groups containing functional groups such as amino, nitrile, hydroxy, mercapto, carboxy, carboxyalkyl, amido, halo, urea, oxiranyl, aziridinyl, oxazolinyl, imidazolinyl, sulfanato, phosphonato, isocyanato, isothiocyanato and combinations thereof. Alkylesters of acrylic and methacrylic esters are examples and can be used in combination with alkylenediamines as one example to add each generation to the dendrimer core. Other polyfunctional compounds may likewise be employed as are described in the literature. One example are the vinylcyanides having the structure:

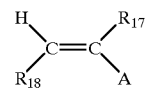

where $R_{17}$=H or —$CH_3$; A=—C≡N; and $R_{18}$ is hydrogen or a hydrocarbon group with 1 to 8 carbon atoms.

Very suitable vinyl-cyanide units that can be used are acrylonitrile and methacrylonitrile.

As will be appreciated by those skilled in the art, a dendrimer can be produced by reaction of acrylonitrile with as the core 1,4-diaminobutane, according to the following reaction:

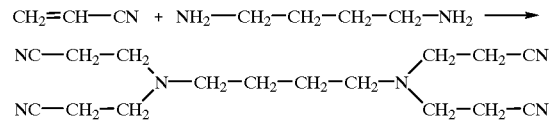

In the above structure, the cyano groups are hydrogenated to the corresponding amine groups to terminate the first generation. These amines which are then capable of undergoing further reaction with a polyfunctional monomer, which may be either the same or different from the polyfunctional group used earlier in the sequence. For example, it is possible to react the foregoing amine terminated compound with additional quantities of acrylonitrile, or it is also possible to use a completely different difunctional monomer such as an alkylester or methylacrylate ster as described above. In general, the dendrimers employed in the practice of this invention have number average molecular weights ranging from 300 to 10,000, once again, depending in part on the structures desired in the final macromolecule. The number of polyolefin prearms coupled to the dendrimer type of backbone will depend on the number of branches or endgroups in the dendrimer molecule. In the practice of this invention, dendrimers of 1 to 5 generations with 4 to 64 branches or end groups can find utility.

A number of different approaches can be taken in preparing dendrimers for use in the present invention. For example, 1,3,5-tris(aminomethyl)benzene can be reacted with acrylonitrile to form, as the second generation dendrimer, a dendrimer containing twelve amino groups:

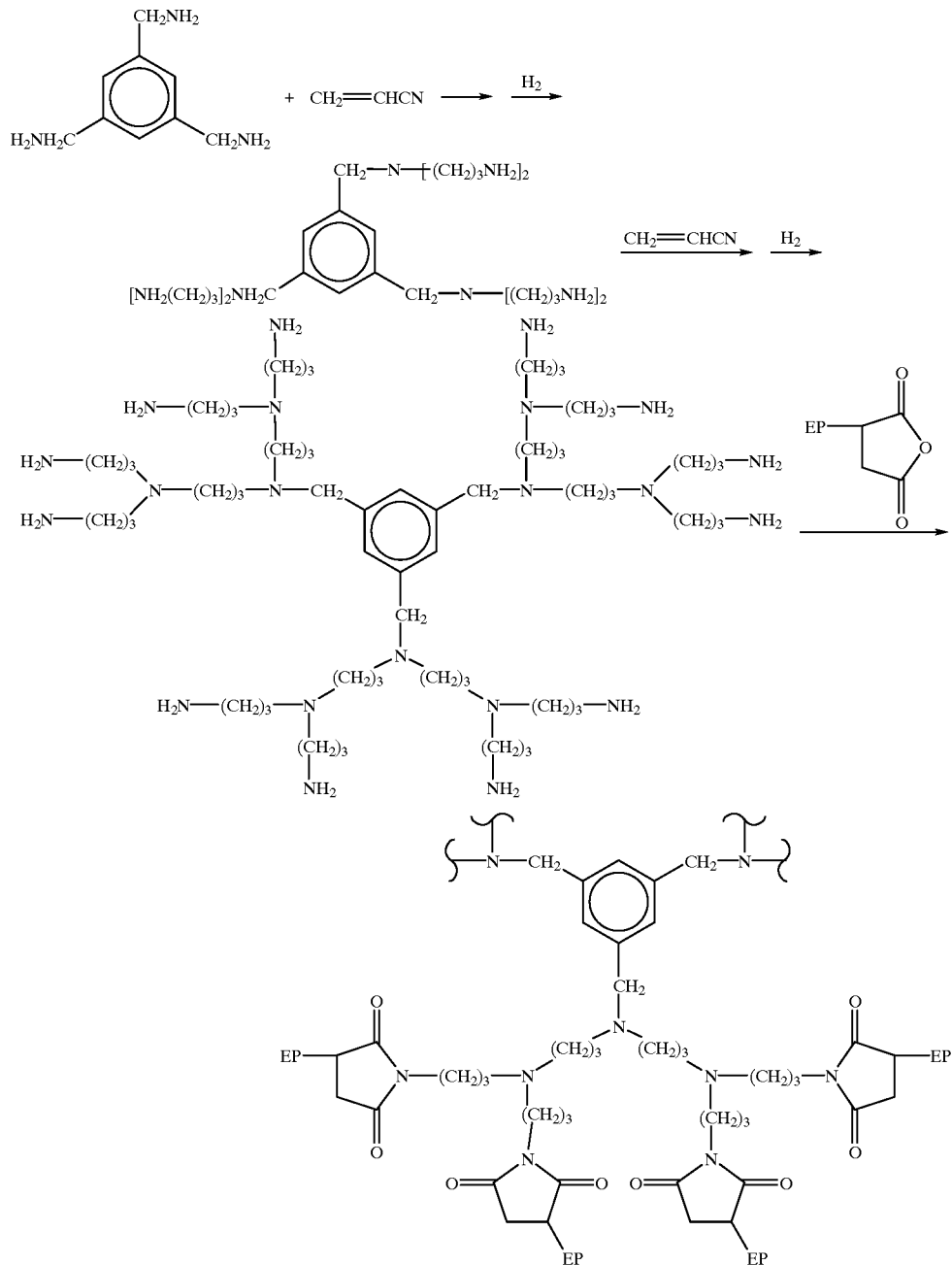

The polyolefin prearm can be coupled to the free amine or hydroxy groups of the foregoing dendrimers by first functionalizing the terminally unsaturated polyolefin to provide on the polyolefin a functional group capable of reaction with such amino or hydroxy groups. As is known to those skilled in the art, the polyolefin can be functionalized to form a prearm by introducing a carboxylic anhydride group or an acid chloride group, either of which can be reacted with the amino or hydroxy group of the dendrimer to couple the polyolefin arm to the dendrimer to form a highly branched structure. The carboxyl group and/or the acid chloride can be conveniently produced by a number of techniques.

One technique is to carry out a hydroboration reaction and react the organoborane with carbon dioxide to form the corresponding acid group which can then be easily converted to its corresponding acid chloride. Alternatively, as described above, the polyolefin prearm can be reacted with maleic anhydride by way of, for example, an ene reaction. Alternatively, it is also possible to convert the polyolefin prearm to the corresponding aldehyde by means of a hydroformylation reaction using catalysts derived from cobalt or rhodium well known for that purpose. The aldehyde derivatized polyolefin prearm can then be reacted with the dendrimer containing terminal amine groups via a Schiff-base reaction to give an imine bond which alternatively can be hydrogenated for added heat stability or can provide a new double bond for other chemical modifications.

Alternatively, a hydroxy terminal polyolefin prearm can be converted to its tosylate by reaction with tosylchloride. The tosylate terminated polyolefin prearm can react with either an amine terminal dendrimer to form an amine linkage or with the hydroxy terminated dendrimer to form an ether linkage of the polyolefin prearm.

Alternatively, it is also possible to convert the polyolefin with terminal unsaturation to a prearm with a corresponding epoxide group which then is capable of reaction with either a free amino group or hydroxy group present in the dendrimer. Epoxidation can likewise be effected using peracid chemistry which is well known to those skilled in the art.

In each case, the polyolefin prearm is capable of reaction with the hydroxy or amino groups of the dendrimer backbone to form a highly branched polymer having the dendrimer as the core or backbone.with polyolefin arms extending therefrom. Highly branched polymers of the same general type can also be prepared by extending the amine or hydroxy terminal group present in the dendrimer backbone with a molecule containing an isocyanate or isothiocyanate group. The free isocyanate or isothiocyanate group thus present in the new dendrimer backbone can be reacted with the polyolefin prearm which has been derivatized as described above to introduce either hydroxyl termination or amine termination, introduced in the polyolefin by way of the hydroboration reaction described above. These branched polymers have polyolefin arms coupled to the dendrimer backbone via the very thermally stable urethane or urea linkage. That series of reactions can be illustrated for a selectively blocked multifunctional isocyanate by way of the following equations:

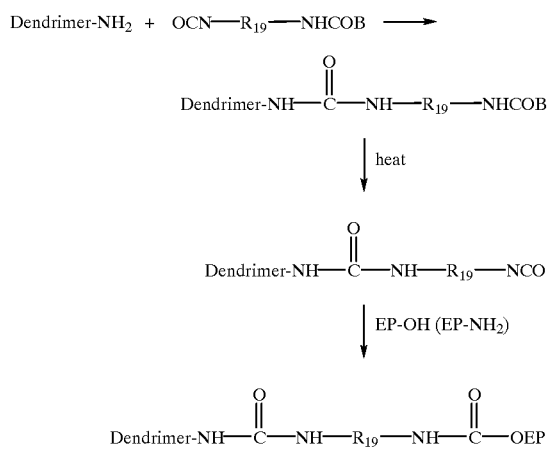

The group —NHCOB— in the above reaction sequence represents a blocked isocyanate function and $R_{19}$ is the remainder of the isocyanate and, preferably, is an alkyl, aryl, cycloalkyl or alkylary group. The blocking molecule can be any of a variety of molecules with an active hydrogen. The blocking molecule can be removed thermally in a subsequent reaction at generally 150° C.–250° C. Typical blocking molecules are phenol, ketoximes, such as methylethyl ketoxime, secondary alcohols such as 2-ethyl hexanol, caprolactam. Reaction conditions to effect blocking and deblocking are well-known in the art.

As an alternate approach to use of selectively blocked diisocyanates use can be made of vinyl isocyanates such as isocyanatoethyl methacrylates (IEM) or m-isopropenyl α,α-dimethyl benzyl isocyanate (TMI). The isocyanate functionality of the IEM or TMI is preferably blocked then incorporated into the dendrimer molecule by way of the conventional Michael reaction with an amine terminal dendrimer. As described previously, the isocyanate function is then regenerated by subjecting the dendrimer to heat to effect deblocking and then reacted with an amine or hydroxy terminal polyolefin prearm as illustrated in the following equations:

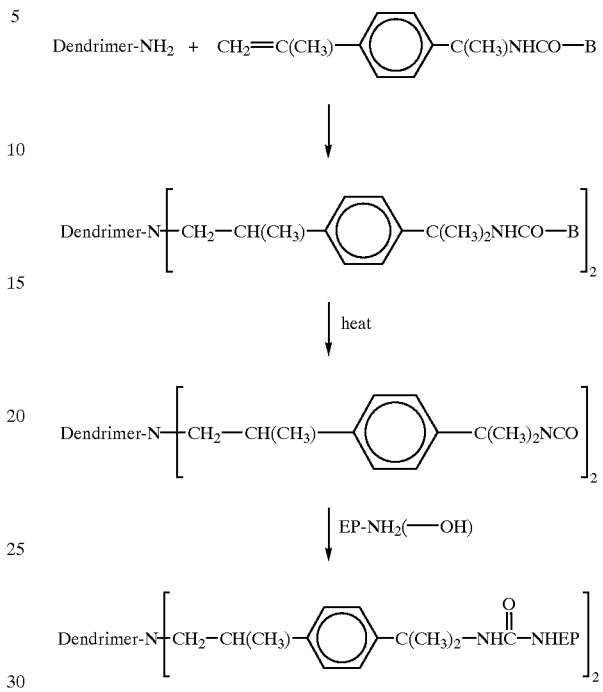

The number of polyolefin arms possible in the above type of branched polymers is generally two times the number of amine terminal branches in the starting dendrimer and typically selection is made of dendrimers with 4 to 16 amine terminal branches.

Alternatively, the polyolefin prearm which has been derivatized to introduce to it either a hydroxy or an amine terminal group can be reacted with, as a difunctional monomer, a selectively blocked multi-functional isocyanate or isothiocyanate. This derivatized polyolefin prearm can be subjected to heat to deblock the isocyanate functionality and in a second reaction step then be reacted with the amine or hydroxy terminal groups of the dendrimer. The foregoing may be illustrated by way of the following:

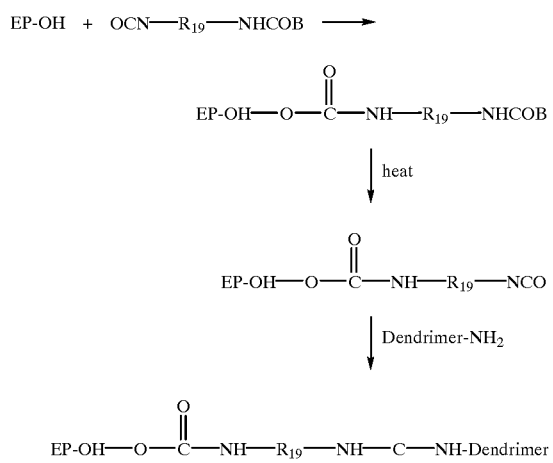

In both cases, the polyolefin prearm becomes coupled to the dendrimer backbone via urea urethane bonds.

As will be appreciated by those skilled in the art, instead of isocyanates, use can be made of other polyfunctional coupling compounds to link chemically the polyolefin prearms to the functional groups of the dendrimer. Also suitable as such linking compounds are di- and tricarboxylic acids and their corresponding esters or anhydrides, amino alkyl alcohols and haloalkyl amines, haloalkyl alchols.

Particularly useful in the preparation of star branched polyolefins is the dendrimer-like backbone obtained from Michael reaction of symmetrical polyamines with unsaturated polycarboxylic acid esters, such as the reaction of methyl itaconate with tris(ethylamino) benzene wherein the first generation product provides twelve carboxy sites for coupling of polyolefin arms. The first generation dendrimer can be expanded with alternating reactions of, for example, 1,4-diaminobutane and methylitaconate or the core amine, tris(ethylamino) benzene can be expanded with one or more generations of N-tosylaziridine to expand the number of arms. With methyl itaconate the number of branches is expanded by a factor of four for each amino group in the core or branched dendrimer backbone:

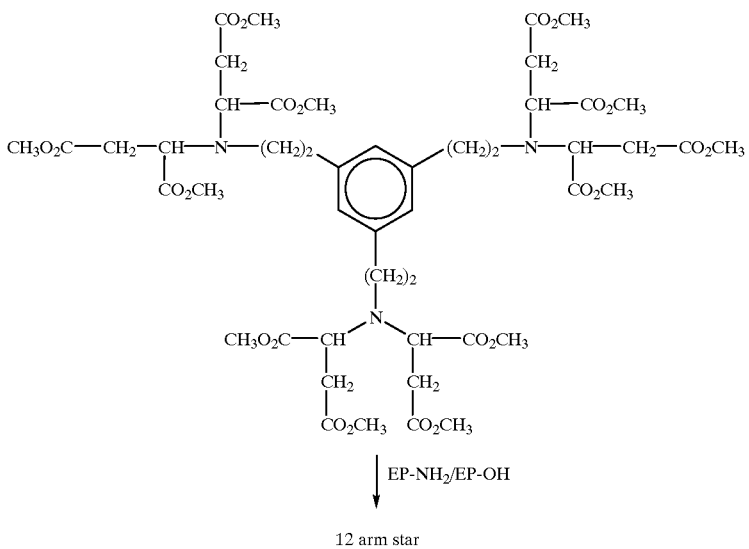

12 arm star

Useful as melamine derivatives in preparation of dendrimer backbones are structures defined by the formula:

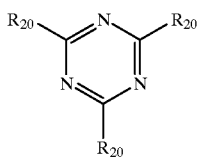

wherein $R_{20}$ is $NH_2-(CH_2)_xOH$, $-(CH_2)_xNH_2$, $-NH(CH_2)_xCO_2H$, $-NH(CH_2)_xOH$, $-NH(CH_2)_xNH_2$ or $-COCH_3$, and x is 1–5.

In the typical preparation of a dendrimer, the reaction sequence is carried out in a stepwise manner. Therefore, it is possible to change the polyfunctional compound at any generation or half generation and introduce a different polyfunctional compound that will impart a special function or characteristics to the dendrimer backbone. In one embodiment of this concept, that special characteristic is antioxidant properties, such as those possessed by aromatic polyamine compounds. Thus, the polyfunctional reagent used in forming the last generation dendrimer should be one capable of reaction with aromatic polyamine compounds possessing antioxidant characteristics. Once the aromatic polyamine is reacted with the dendrimer, its generation can be repeated, the original generations can be repeated, or it can, in turn, be coupled with a polyolefin prearm to form a branched polyolefin with antioxidant properties and a dendrimer molecule as the core or backbone.

This concept of the invention can be represented by a number of specific techniques. For example, it is possible to use, as the core, diaminobutane which can then be reacted with acrylonitrile followed by hydrogenation to form a first generation dendrimer as described previously. That dendrimer, after conversion to the corresponding amine, is reacted, in the next step, with a methylacrylate to form a half generation with the structure, thus:

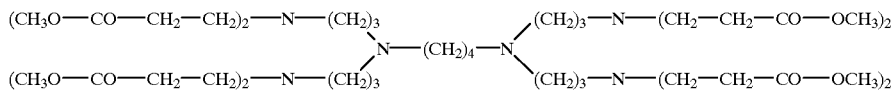

In the next step, the generation is completed for the above-described dendrimer by reaction with an aromatic polyamine compound having antioxidant properties. A number of such compounds are known, including 4,4'-diaminodiphenylamine. Other suitable compound are aminoalkyl substituted phenothiazines; representative of the latter group is 4,4'bis-(2-aminoethyl)phenothiazine. Those compounds, containing aromatic amine groups, are reactive with the terminal groups of the dendrimer containing the acetate groups to form the corresponding amides with the aromatic polyamines. The new dendrimer backbone is the product of that reaction, and can be illustrated by way of the following:

As will also be appreciated by those skilled in the art, other sequences of reagents in forming the dendrimer may likewise be used. It is important, however, that the immediately preceding dendrimer prior to reaction with the aromatic polyamine compound have a functional group which is reactive with the aromatic polyamine group so as to incorporate the antioxidant-containing aromatic polyamine compound into the dendrimer molecule. As will also be appreciated by those skilled in the art, other coupling mechanisms previously described may likewise be used to couple the polyolefin prearm to the terminal amine of this type of dendrimer molecule. Instead of a polyolefin prearm containing a maleic anhydride group, it is also possible to

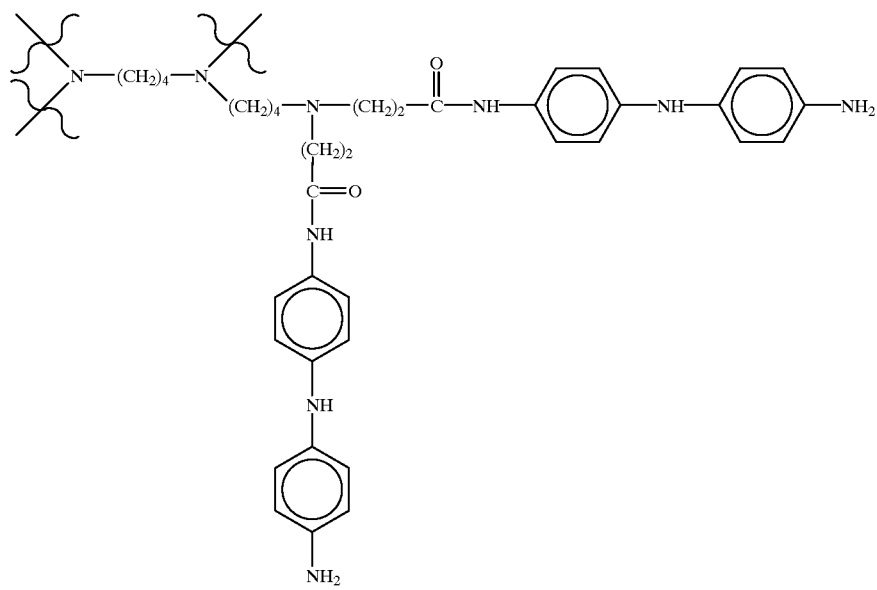

It will be understood that the unsatisfied bonds in the foregoing structure contain the same groups.

That dendrimer backbone, containing terminal amine groups, can then be reacted with a functionalized polyolefin prearm containing, for example, a terminal maleic anhydride group to thereby couple the polyolefin prearm to the amine groups to form an imide linking the polyolefin prearm to the dendrimer structure. The macromolecules thus contain both the polyolefin arm, as well as a aromatic polyamine group to improve the antioxidant characteristics of the dendrimer. It will be noted that each branch of the polymer containing the polyolefin arm also contains an aromatic polyamine group in a one-to-one distribution.

As will be appreciated by those skilled in the art, use can also be made instead of the 4,4'bis-(2-aminoethyl) phenothiazine, the phenothiozines described above, as well as other aromatic polyamine compounds.

employ a polyolefin prearm functionalized with a terminal expoxy group or a terminal carboxylic acid or an acid chloride group or a tosylate.

As an alternative technique one can couple polyolefin prearm directly via a polymerization reaction by incorporation of difunctional polymerizable monomers in the form of vinyl isocyanates. Examples of such monomers are IEM and TMI as previously described. In accordance with this embodiment, the amine or hydroxy terminal polyolefin is directly reacted with the TMI or IEM via the isocyanate functionality to provide a new unsaturated polyolefin prearm with a urea, urethane bond. The unsaturation in this new prearm can be subjected to conventional free radical or anionic polymerization conditions either alone or in combination with other styrene-like or (meth)acrylate-like comonomers known to undergo such copolymerization reactions. Branched polymers as thus described can be exemplified by the following equation using styrene and methyl methacrylate as comonomers:

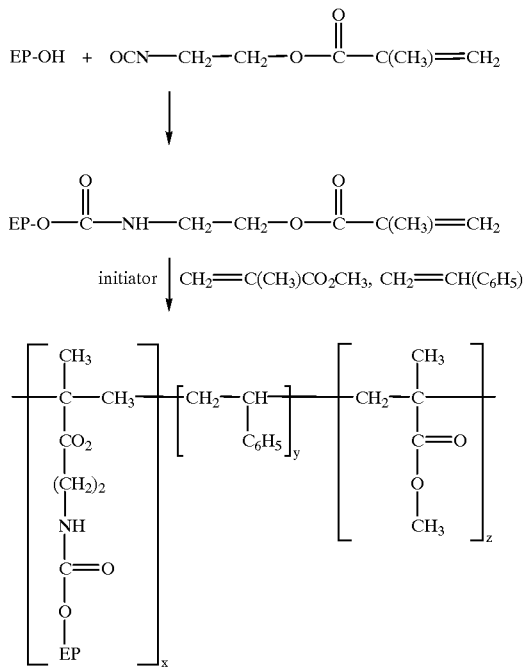

wherein x is 5 to 30 weight percent IEM derivatized polyolefin arm, y is 25 to 65 weight percent styrene and z is 30 to 70 weight percent methylmethacrylate.

It is also possible, in accordance with a further embodiment of the invention, to utilize, in forming a reactive polymeric backbone, multifunctional isocyanates or extended isocyanates. One technique that can be employed is based on the known ability of isocyanates to trimerize to form a very stable six-member ring structure. Such compounds are known as isocyanurates, and have the structure:

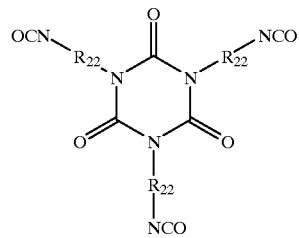

wherein each $R_{22}$ group is an alkyl group of 1 to 8 carbons, an aryl group, an alkyl phenyl group. Some more common isocyanurates commerically available are the trimers from the trimerization of 1,6-diisocyanato hexamethylene, 2,4-toluene diisocyanate, isophoronediisocyanate, toluidine diisocyanate, 4,4'dicyclo-hexylmethane diisocyanate. The isocyanurate can be reacted with an amine or hydroxy terminal polyolefin prearm to provide a branched polyolefin with three arms. Alternatively, as more typical with higher molecular weight polyolefins, the reaction will stop after the incorporation of one to two arms providing instead a "linear polyolefin". Those "linear polyolefins" can be coupled with monomer having multi-hydroxy or multi-amine functions, as provided by simple polyols and melamines or its derivatives as previously defined. Polyols useful in the practice of this invention include glycerine, glycols, pentaerythritol, Pluracol® polyols, benzenes, tris(alkylamino) benzene, trimethylolpropane, trihydroxybenzene, triaminobenzene, first generation dendrimer like molecules formed by reaction of diamines (or poly amines) with ethylene oxide, such as Quadrols® (trademark of BASF Wyandotte Corporation) tricarboxylic acids, etc. Branched polyolefins with 6 to 24 arms coupled by way of a urea/urethane linkage are conveniently prepared.

Use of "extended isocyanates" as a backbone of this invention relies on the reaction of selective diisocyanates with polyols or melamines followed by a secondary trimerization with the corresponding selectively blocked diisocyanate as represented in the following equation when an excess of toluene diisocyanate is reacted with pentaerythritol:

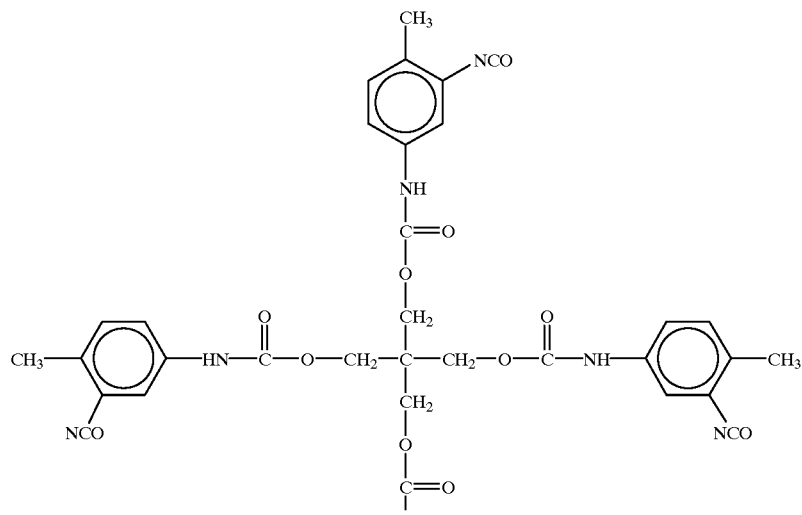

-continued
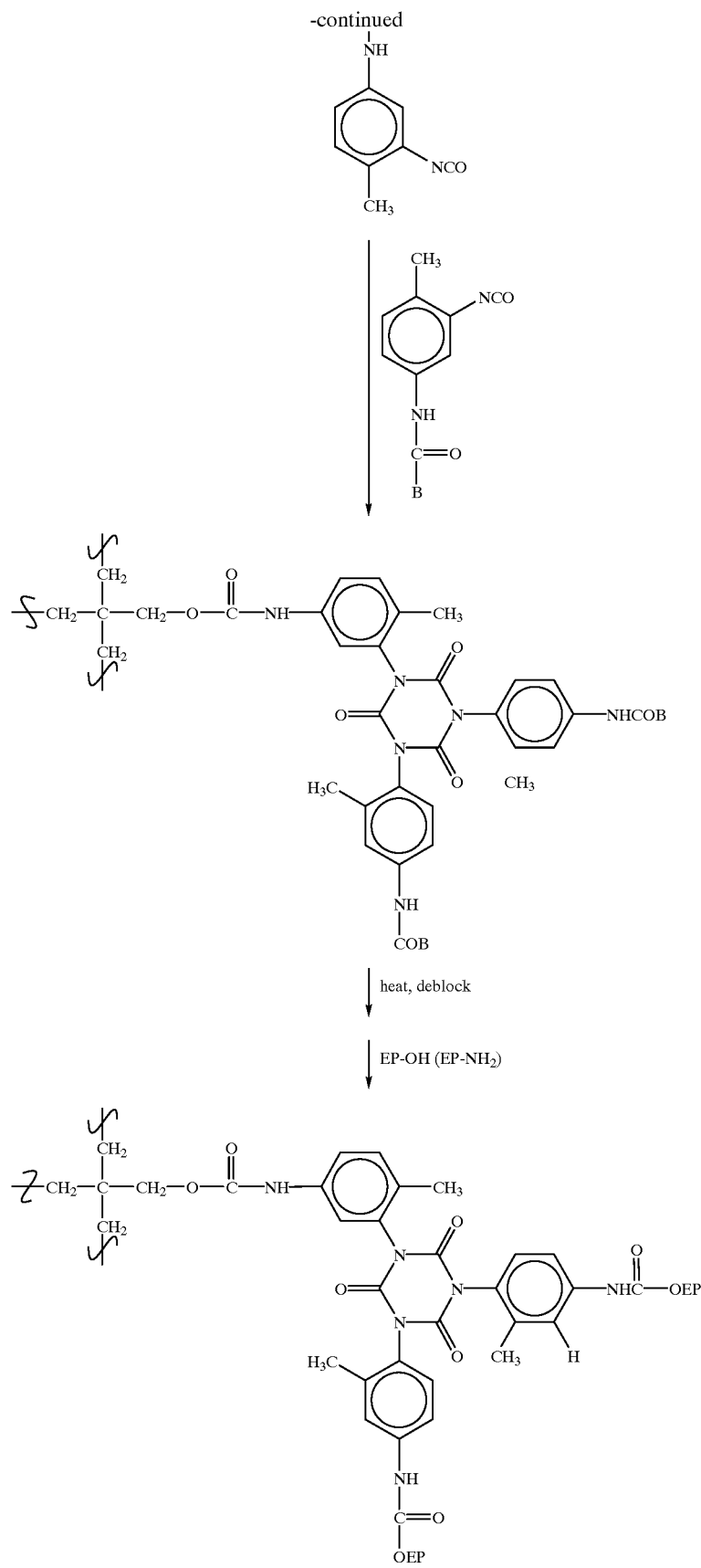

By "selective diisocyanate" it is understood in the art that the two NCO groups are not equally reactive, that is, one of the NCO groups will preferably undergo blocking and trimerization reactions leaving the other NCO for later chemical modification. Toluene diisocyanate and isophorone diisocyanate (see J. Coatings Technology, Vol. 54, no. 687, 1982, pg. 43) are examples of selective diisocyanates.

An "extended isocyanate" backbone can also be prepared by alternating the reactions of polyols and selective diisocyanates. An example of this type of backbone is formed by the reaction of first trimethylol propane with toluene diisocyanate. Initially the para NCO group reacts exclusively. Further reaction of this Isocyanurate with pentaerythritol provides a core molecule with nine hydroxy groups. These can be reacted with an equivalent of toluene diisocyanate to provide a branched backbone with nine isocyanate groups, which when reacted with hydroxy or amino terminal polyolefins, generates a nine arm star branched polyolefin. Reaction of a Isocyanurate or oither triisocyanates with other polyols and selective diisocyanates in sequence can generate a backbone with six to fifteen arms.

Branched polyolefins of the present invention, once formed, are stable and can be modified by additional chemical reactions so as to provide specific end use as a fuel or lubricating additive and more particularly as a multifunctional fuel or lubricant additive. One such reaction is functionalization by means of a free radical graft reaction or a graft polymerization reaction. Polyolefin grafted polymers are themselves well known to those skilled in the art. Similar chemical reactions can be used to graft the branched polyolefins of this invention. Suitable graft monomers include unsaturated dicarboxylic acid anhydrides, their esters, and their corresponding acids, preferably those having the general formula:

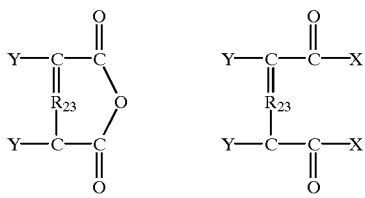

wherein $R_{23}$ is an alkyl group having 0 to 4 carbon atoms and Y is preferably hydrogen but may also be an organic group such as a branched or straight chain alkyl group, an anhydride, a ketone group, a heterocyclic group or other organic group containing 1 to 12 carbon atoms. In addition, Y can be a halogen such as chlorine, bromine or iodine. X can be OH or an alkoxy group wherein the alkyl group contains 1 to 8 carbon atoms. Preferred among those graft monomers are maleic anhydride, itaconic anhydride.

Also suitable as the graft monomer for functionalizing a branched polyolefin are the derivatives of olefinically unsaturated carboxylic monomers such as, acrylic or methacrylic acid, or their esters, graft monomers which are likewise known to those skilled in the art. Typically, acrylic and methacrylic acid derivative contain 4 to 16 carbon atoms. Preferred among the acrylic and methacrylic acid graft monomers are those having the structure:

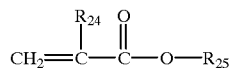

wherein $R_{24}$ is hydrogen or $C_1$ to $C_4$ alkyl (e.g., methyl, ethyl, etc.) and $R_{25}$ is selected from the group consisting of a $C_1$ to $C_4$ alkyl group, a keto functional alkyl group, an epoxy functional alkyl group, —$NH_2$ or —$NR'_2$ where R' can be H or $C_1$ to $C_8$ hydrocarbon and both R' groups need not be the same. Particularly preferred among the group of acrylic or methacrylic graft monomers are glycidyl methacrylate, methylacrylate, methylmethacrylate, ethylmethacrylate and aminopropylmethacrylate, and acrylamide.

Another group of graft monomers which can be used to functionalize a branched polyolefin are vinyl amines containing 2 to 25 carbon atoms, and preferably heterocyclic vinyl amines. Such amines are themselves known as functionalizing graft monomers and include allylamines, vinyl benzylamines, N-vinylpyridines, N-vinylpyrrolidones, vinyl lactams, vinylcarbazoles, vinylimidazoles and vinylthiazoles as represented by 2-vinylpyridine, N-vinylpyrrolidone, vinyl caprolactam, 1-vinylimidazole, allylamine, 4-methyl-5-vinylthiazole and 9-vinylcarbazole. Such graft monomers are described in detail in U.S. Pat. No. 4,340,689, the disclosure of which is incorporated herein by reference.

As it will be appreciated by those skilled in the art, other vinyl monomers described in the prior art as suitable for functionalizing such branched polyolefin polymers may likewise be used in the practice of the present invention. Examples of such further vinyl compounds are the vinyl silanes and vinylbenzyl halides as represented by vinyltrimethoxysilane, vinyidiethychlorosilane, vinylbenzylchloride and the like. Further descriptions of suitable silane graft monomers are described in U.S. Pat. No. 4,340,689, the disclosure of which is incorporated herein by reference.

Branched polyolefin polymers functionalized via a free radical reaction useful as fuels and/or lubricating oil additives, derivatized branched polyolefins, typically will have a degree of graft in the range of 0.05 to 20 percent based on the weight of graft monomer divided by the total weight of the branched polyolefin. The degree of graft will vary depending on the specific performance criteria required of the additive and its specific molecular weight.

The grafted branched polyolefins of the present invention capable of reacting with amine functionality can be reacted with polyamines to provide dispersant properties for application in fuel and lubricating oil. Polyamines suitable for imparting dispersant, detergent properties in fuels suitable in the practice of this invention must contain at least one primary amine group and -at least one other amine group not necessarily primary within its structure. Such polyamines are illustrated by the class of (1) alkylene polyamines such as ethylene diamine, diethylene triamine, tetraethylene pentamine, nonaethylene decamine, 1,2-propylene diamine, trimethylene diamine, tetramethylene diamine, N,N-dimethylaminopropylamine, di-(trimethylene)triamine, 1,3-diamino-2-hydroxypropane, N-(2-hydroxyethyl)ethylene diamine, N-(3-hydroxybutyl)tetra methylene diamine, N-(3-aminopropyl)-4-(2-hydroxyethyl) piperidine, N-(aminomethyl) piperidine, N-(aminoethyl) piperdine, N-(aminopropyl) piperdine, 3-amino-N-ethyl piperidine; (2) heterocyclic polyamines such as, N-(2-aminoethyl) piperazine, 1,4-bis-(2-aminoethyl) piperazine, N-(aminoethyl) morpholine, N,N'-di(aminoethyl) imidazodidone, 2-methyl piperazine, 3-aminopyridine, aminopyrazines, amino pyrimidines, amino perimidines, aminocarbazoles, aminopyrroles, amino imidazolines, aminothiadiazoles, and aminoindoles; (3) aryl polyamines, such as N-aryl-phenylene diamines, aminoalkylphenothiazines, and (4) polyoxy alkylene diamimes of the formula:

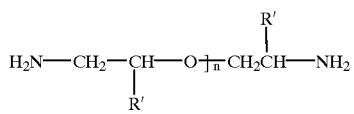

in which R' represents a hydrogen or alkyl radical of 1 to 2 carbon atoms and n is 5 to 200, as described in U.S. Pat. Nos. 4,234,435, and 5,366,518, the disclosures of which are incorporated herein by reference.

Polyamines suitable for imparting dispersancy, antioxidant, antiwear, etc., properties to branched polyolefins for use in lubricating oils include the above polyamines as well as polyamines disclosed in U.S. Pat. Nos. 4,340,689, 4,670,515, 4,863,623, 5,021,177, 5,035,819, 5,094,765, 5,094,766, 5,147,569, 5,112,508, 5,160,446, 5,162,086, 5,167,845, 5,182,041, 5,188,745, 5,200,100, 5,200,102, 5,238,588, 5,264,139, 5,264,140, 5,275,746, 5,374,364, 5,384,371, 5,409,623, 5,424,366, the disclosures of which are incorporated herein by reference.

The branched polyolefins and derivatized branched polyolefins of this invention may be incorporated as additives in a minor effective amount to a major portion of a lubricating oil. They can be employed in a variety of oils of lubricating viscosity including natural and synthetic lubricating oils and mixtures thereof providing multifunctional properties such as dispersancy, viscosity index improvement, pour point depressants, antioxidant, antiwear properties. They can be employed in crankcase oils for spark ignited and compression-ignited internal combustion engines, gas engines or turbines, gear lubricants, automatic transmission fluids, hydraulic fluids, metal-working lubricants, and grease compositions. Generally branched polyolefin polymers as additives will be incorporated into the oil at a concentration of 0.5 to 20 weight percent. Oil concentrates of the branched polyolefin polymer additives may contain from 1 to 80 weight percent of the additive in a diluent or carrier oil.

The branched polyolefin polymers and the derivatized branched polyolefin polymers may also be used in combination with conventional lubricant additives known in the art as dispersants, detergents, antioxidant, pour point depressants, antiwear agents, foam inhibitors, friction modifiers, rust inhibitors and the like.

The branched polyolefin polymers and derivatized branched polyolefin polymers may be incorporated as dispersant, detergent additives in a minor effective amount in a major portion of liquid petroleum fuel. Such petroleum fuels are middle distillates boiling in the range of 65° to 430° C. and include gasoline, kerosene, diesel fuels, jet fuels, home heating fuels, and the like. The minor effective amount necessary to achieve desired detergency and dispersancy properties will depend on the type of the fuel and the presence of other additives. Generally 100 to 7000 ppm by weight and preferably from 200 to 2000 ppm of the branched polyolefin additive is employed.

The branched polyolefin polymers useful as additives for fuel are characterized as having nitrogen atoms present either in the backbone or as a pendant group attached to the polyolefin arm. The nitrogen atom may be primary, secondary, tertiary or combinations thereof. Generally, nitrogen will be present in an amount of at least 0.03 weight percent of the branched polyolefin additive and preferably 0.1 weight percent.

For convenience in shipping and handling, the branched polyolefins and derivatized branched polyolefins may be formulated as a concentrate in an aromatic solvent for use in fuels. Aromatic solvents useful for preparation of concentrates includes benzene, toluene, xylene and higher boiling aromatics. It can also be desirable for application as a detergent, dispersant additive to prepare the concentration from a solution of C3 to C8 aliphatic alcohols such as isopropanol, n-butanol and the like or aliphatic ethers such as methyltertbutyl ether dissolved in the aromatic hydrocarbon solvent. Generally, the branched polyolefin and derivatized branched polyolefin will be present at a concentration of 10–20 weight percent and preferably 30–60 weight percent.

The gasoline fuel compositions with branched polyolefin polymers of this invention may employ, other additives, known to those skilled in the art, as oxygenates, antiknock agents, other dispersants, detergents, lead scavengers, antioxidants, metal deactivators, pour point depressants, corrosion and foam inhibitors. Additionally, diesel fuel compositions with the branched polyolefin polymers may contain pour point depressants, flow improvers, etc., as necessary for formulating diesel fuel.

The following examples are provided to illustrate the invention.

The following characterization and tests were conducted on polyolefin prearms, branched polyolefin polymers, and/or their fuel or lubricating oil solutions.

The ethylene content, reported as $C_2$ (mol %) of the polyolefin prearms was determined by means of Fourier Transform Infrared Spectroscopy.

The molecular weight of the polymeric prearms and branched polymers was determined with Size Exclusion Chromatography-Differential Viscometry (SEC-DV) at a temperature of 150° C. using 1,2,4-trichlorobenzene as solvent. A Waters M150C GPC with DRI-detector and a Viscotek Differential Viscometer (DV) Model 100-02, the detectors connected in parallel, was used with Toyo Soda (TSK) GMHXL-HT, mixed bed (4x) columns (plate count of 25000 as determined on n-C28H58). The SEC-DV technique was used to calculate the number average molecular weight (Mn) in units of g/mole, the weight average molecular weight (Mw) in units of g/mole, and the molecular weight distribution (MWD=Mw/Mn) using a universal calibration curve based on polyethylenes as standards. The intrinsic viscosity, IV, in dl/g was determined from the SEC-DV experiment also at 150° C. in 1,2,4-Trichlorobenzene with 1 g/l of Ionol antioxidant as stabilizer. The number of arms (arms-T) on the branched polyolefin polymers was defined as the ratio of the molecular weight at the top of the SEC-DV chromatogram of the branched polymer to the molecular weight at the top of the SEC-DV chromatogram of the original polyolefin prearm (before the coupling reaction). A second method of estimating the number of arms (arms Mw) was to divide the Mw of the branched polyolefin (including the residual prearm) by the Mw of the polyolefin prearm (polyolefin prior to the coupling reaction). Therefore, the number of arms as defined herein was the mean number of arms on the backbone for that experiment.

The type and degree of terminal unsaturation (TU) was determined by Proton Nuclear Magnetic Resonance Spectroscopy ($^1$H-NMR) and are reported as groups per 100,000 carbon atoms. Calculations were based on standard published procedures routinely practiced by those skilled in the art.

Kinematic Viscosity: Measured according to ASTM-D445.
Thickening Power (TP): Is the difference in centistokes (cSt) between the Kinematic Viscosities of the dilute solution of the VI improver in diluent oil and the diluent oil, both measured at 100° C.

Shear Stability Index: Measured according to ASTM-D3945 (A).
Shear Stability Index (SSI) is determined as $$SSI = \frac{Vbs - Vas}{TP} \times 100\%$$

Where
- Vbs and Vas are defined as the viscosities of polymer solution before and after shearing, respectively.
- TP is defined as thickening power which is determined by the difference between Vbs and the viscosity of the solvent.
- The (Vbs–Vas) ids viscosity loss determined according to the ASTM Method D-3945 (Proc. A).

Cold Cranking Simulator (CCS): Measured according to ASTM-D2602 at $-25°$ C.
Mini-Rotoviscometer (MRV): Measured according to ASTM-D3829, at $-30°$ C.
Bench Dispersancy: A sample of branched polyolefin additive being tested is blended into a formulated oil which does not contain any dispersant to make a solution of the VI improver in the formulated oil. This oil solution is then tested for dispersance in the Bench Dispersancy Test. In the Bench Dispersancy Test, the dispersancy of the experimental oil is compared to that of three reference oil standards which give excellent, good, and fair results in the test. The numerical value of a test result decreases with an increase in dispersant activity. A rating value below 50 is considered very good, while a rating above 80 is considered unacceptable.

Preparation of Terminally Unsaturated Polyolefin Prearms

Polymer A

An ethylene-propylene polymerization was performed in a 1.5 liter (l) batch reactor. The reactor was fed with 300 ml hexane. Subsequently the reactor was pressurized with ethylene (C2) and propylene (C3) to 0.8 MPa and conditioned in order to reach a molar ratio of propylene to ethylene in the headspace of 2:1. The temperature of the reactor was maintained at $40°$ C. Next 4 micromoles of $S(2\text{-Ind})_2ZrCl_2$ (sulphur bridged di-indenyl zirconium dichloride) and 5 mmoles of methylaluminoxane were fed to the reactor. During the polymerization the monomer concentrations were kept constant as much as possible by dosing 200 standard liter/hour (sl/hr) propylene and 100 sl/hr ethylene to the reactor. After 30 minutes the polymerization was ended by depressurizing the reactor. The polymer solution was recovered, the solvent evaporated and the polymer was dried in vacuo at $80°$ C. Analysis of the polymer resulted in the following data:

| Mn (g/mole) = 1,320 | C2 (mol %): 55 |
|---|---|
| Mw (g/mole) = 2,500 | 395 vinyl groups |
| MWD = 1.9 | 935 vinylidene groups |

Polymer B

Ethylene ($C_2$) and propylene ($C_3$) copolymerizations were performed in a 1.5 l continuous stirred type reactor in hexane as solvent. The hexane, monomers, and catalyst components were continuously fed to the reactor at the conditions described in Table 1 below. The catalyst employed was $Et(1\text{-Ind})_2ZrCl_2(Zr)$ with methylaluminumoxane (Al) as cocatalyst. The polymerization temperature (Temp $°$C.), residence time ($\tau$, min), and production rate were varied to vary molecular weight properties of the polyolefin prearms. The copolymer solution was continuously removed from the reactor. The polymeric prearms isolated from the hexane solution were analyzed for ethylene content ($C_2$), molecular weight (Mn, Mw), and terminal unsaturation (TU=terminal vinylidene groups and terminal vinyl groups per 100,000 carbon atoms) as described in Table 1.

TABLE 1

| | Polymerization Conditions | | | | | | | Prearm Analysis | | | |
|---|---|---|---|---|---|---|---|---|---|---|---|
| Polymer B-# | Hexane kg/hr | $C_2$ sl/hr | $C_3$ sl/hr | Zr µmol/hr | Al mmol/hr | Temp $°$ C. | $\tau$ min | Mn kg/mol | Mw kg/mol | $C_2$ mol % | TU |
| B1 | 1.67 | 138 | 429 | 20 | 10 | 35 | 15 | 28 | 61 | 64 | 40/9 |
| B2 | 1.64 | 143 | 442 | 25 | 12 | 40 | 15 | 24 | 58 | 64 | 50/17 |
| B3 | 2.70 | 194 | 449 | 10 | 5 | 54 | 9 | 23 | 47 | 60 | 54/16 |
| B4 | 2.69 | 194 | 450 | 12.9 | 6.5 | 60 | 9 | 21 | 44 | 60 | 56/16 |
| B5 | 2.69 | 194 | 450 | 16 | 8 | 61 | 9 | 20 | 44 | 60 | 56/16 |
| B6 | 2.70 | 194 | 449 | 19.4 | 9.1 | 55 | 9 | 16 | 40 | 55 | 65/19 |
| B7 | 1.85 | 135 | 409 | 19.4 | 9.1 | 68 | 12 | 17 | 37 | 50 | 62/18 |
| B8 | 2.52 | 200 | 274 | 28.5 | 15.9 | 72 | 11 | 20 | 46 | 67 | 42/24 |
| B9 | 2.37 | 181 | 103 | 46 | 23 | 80 | 13 | 20 | 45 | 74 | 58/20 |
| B10 | 1.97 | 198 | 118 | 14.6 | 7.3 | 94 | 15 | 18 | 48 | 78 | 53/22 |
| B11 | 2.39 | 201 | 118 | 24 | 12 | 72 | 12 | 22 | 52 | 74 | 43/19 |

Polymer C

An ethylene polymerization was performed in accordance with the procedure for Polymer A. The reactor was fed with 750 ml pentamethylheptane. Subsequently, the reactor was pressurized with ethylene solely to 0.8 MPa. The temperature of the reactor was maintained at $185°$ C. Next a $MgCl_2$ supported Ti-catalyst (Ti-concentration is 0.002 mmole/l) and 0.05 mmole/l of triethylaluminum were fed to the reactor. During the polymerization the ethylene pressure was kept constant as much as possible. After 10 minutes the polymerization was terminated by depressurizing the reactor. The polymer was recovered by evaporating the solvent and drying under vacuum at $60°$ C. The analysis on Polymer C was as follows:

| Mn (kg/mole) = 16 | 43 vinyl groups |
|---|---|
| Mw (kg/mole) 55 | 6 internal C = C |
| MWD = 3.5 | |

Polymer D

A propylene polymerization was performed in accordance with the procedure for Polymer A. The reactor was fed with 500 ml heptane. Subsequently, the reactor was pressurized with propylene solely to 0.7 MPa. The temperature of the reactor was maintained at 40° C. Next 10 micromoles of $Me_2Si(2,4Me_2Cp)_2ZrCl_2$ [dimethylsilyl bridged di(2,4-dimethylcyclopentadiene) zirconium dichloride] and 32 mmoles of methyl aluminoxane were fed to the reactor. During the polymerization the propylene pressure was kept constant as much as possible. After 30 minutes the polymerization was terminated by depressurizing the reactor. The polymer was recovered by evaporating the solvent and drying under vacuum at 60° C. Analysis on Polymer D gave the following results:

| | |
|---|---|
| Mn (kg/mole) = 5.5 | 250 vinylidene groups |
| Mw (kg/mole) = 9.2 | |
| MWD = 1.7 | |

Polymer E

An ethylene-propylene-1-octene terpolymerization was performed according to the procedure for Polymer B. Solvent, monomers and catalyst components were continuously fed to the reactor and the polymer solution was continuously removed from the reactor. The following parameters were used:

| | |
|---|---|
| Hexane (kg/hr) = 2.32 | Catalyst $VOCl_3$/promoter = ($\mu$mole/hr) = 1.2/4.8 |
| Ethylene (sl/hr) = 86.7 | |
| Propylene (sl/hr) = 109.7 | Cocatalyst $(Et_2AlCl)$(mmole/hr) = 30.4 |
| Octene (ml/hr) = 150 | Polymerization temperature (° C.) = 39 |
| Production (g/hr) = 190 | Reactor residence time (min) = 13 |

Dichlorophenyl acetic acid ethyl ester was used as a promoter for the catalyst. Analysis on Polymer E resulted in the following data:

| | |
|---|---|
| Mn (kg/mole) = 21 | C2/C3/C8 (mole %) = 66/28/6 |
| Mw (kg/mole) = 57 | 12 vinyl groups |
| MWD = 2.7 | 18 vinylidene groups |
| | 35 trans vinyl groups |

Purification of Polyolefins Prearms

In some cases, when it was necessary to facilitate functionalization or coupling of the ethylene-propylene copolymers the catalyst and co-catalyst residues were removed. Polymers were dissolved in hexane and washed with 4N hydrogen chloride solution. The hexane layer was subsequently washed with water 3 times, then the hexane was evaporated and the resulting polymer was dried at 80° C. in vacuo.

Reaction of Terminally Unsaturated Polyolefin Prearms with Polyhydrosilanes

EXAMPLE 1

Polymer A dissolved in toluene was mixed with Polymethylhydrosiloxane which contained an average of 48 Si—H groups per molecule in a 1:1 molar ratio of C═C in Polymer A to Si—H in the siloxane. $H_2PtCl_6$ $6H_2O$ dissolved in isopropanol was added at ratio of 0.022 moles per mole of C═C. The reaction mixture was stirred at 80° C. for 48 hrs. The polymer recovered after evaporation of the solvent at 80° C. under vacuum was analyzed by SEC-DV to have 48 arms.

General Procedure for Comb Polymers from Reaction of Terminally Unsaturated Ethylene-Propylene Polymeric Prearms with Linear Polyhydrosilanes

EXAMPLE 2

Polymer B dissolved in toluene and Polymethylhydrosiloxane (PMHS) with a known average molar content of Si—H groups per molecule (see Table 2A) also dissolved in toluene were mixed to provide a molar ratio of SiH to C═C in Polymer B of 5/1. Then $H_2PtCl_6$ $6H_2O$ dissolved in isopropanol was added in a molar ratio of Pt to C═C in Polymer B of 1/1000. The reaction mixture was stirred at elevated temperature for a time to effect the desired coupling (see Table 2A for specific conditions) after which the reaction was blocked with an excess of 1-octene. The branched polymer was recovered by evaporation of the toluene under vacuum at 80° C. The recovered polymer was analyzed by SEC-DV to provide the data in Table 2B.

TABLE 2A

Preparation of Comb Branched Polymers by Hydrosilation Reactions

| Example | Polyolefin Prearm | | Coupling Reaction Conditions | | | | | |
|---|---|---|---|---|---|---|---|---|
| # 2- | B-# | C2 mol % | PMHS[1] | CE[2] | Temp ° C. | Time hrs | Rxn[3] Conc | Catalyst Solvent |
| a | B-1 | 64 | 48 | 71 | 90 | | | THF |
| b | B-2 | 64 | 48 | 83 | 90 | 168 | 15/100 | THF |
| c | B-3 | 60 | 48 | 70 | 90 | 420 | 53/500 | THF |
| d | B-4 | 60 | 48 | 69 | 90 | 168 | 5/50 | THF |
| e | B-6 | 55 | 50 | 90 | 90 | 72 | 25/250 | THF |
| f | B-10 | 78 | 32 | 88 | 130 | 96 | 7/70 | IPA |
| g | B-7 | 50 | 50 | 85 | 90 | 168 | 102/1000 | IPA |
| h | B-8 | 67 | 50 | 89 | 90 | 72 | 25/250 | IPA |
| i | B-9 | 74 | 50 | 88 | 90 | 72 | 25/250 | IPA |
| j | B-11 | 74 | 32 | 75 | 90 | 72 | 5/50 | IPA |
| k | B-10 | 78 | 32 | 92 | 90 | 96 | 7/70 | IPA |
| l | B-10 | 78 | 32 | 94 | 90 | 96 | 7/70 | IPA |
| m | B5/B10 | 60/78 | 32 | 89 | 90 | 86 | 7/70 | IPA |

TABLE 2A-continued

Preparation of Comb Branched Polymers by Hydrosilation Reactions

| Example # 2- | Polyolefin Prearm | | Coupling Reaction Conditions | | | | | |
|---|---|---|---|---|---|---|---|---|
| | B-# | C2 mol % | PMHS[1] | CE[2] | Temp °C. | Time hrs | Rxn[3] Conc | Catalyst Solvent |
| n | B5/B11 | 60/74 | 32 | 80 | 90 | 72 | 7/70 | IPA |
| o | B11 | 74 | 80 | 77 | 90 | 48 | 7/70 | IPA |

[1]The average molar content of Si-H groups per molecule of polymethylhydrosiloxane; PMHS with 48 has Mn of 2880, 32 has Mn of 1920, 50 has Mn of 3000 and 80 has Mn of 4800.
[2]The Coupling Efficiency defined as the percent of polyolefin prearms chemically bound to the PMHS.
[3]Grams prearm/ml toluene.

TABLE 2B

Molecular Weight Properties of Branched Polyolefins Polymers

| Example # 2 | Mn kg/mol | Mw kg/mol | MWD | #arms[1] T/Mw | IV[2] |
|---|---|---|---|---|---|
| a | 76 | 285 | 3.7 | 5/5 | 1.19 |
| b | 77 | 390 | 5.0 | 6/7 | 1.30 |
| c | 52 | 320 | 6.0 | 6/7 | 1.01 |
| d | 45 | 420 | 9.5 | 4/10 | 1.00 |
| e | 64 | 220 | 3.4 | 5/6 | 0.97 |
| f | 62 | 380 | 6.2 | 5/8 | 1.46 |
| g | 59 | 180 | 3.0 | 4/5 | 0.87 |
| h | 77 | 280 | 3.6 | 5/6 | 1.22 |
| i | 80 | 320 | 3.9 | 6/7 | 1.19 |
| j | 63 | 185 | 2.9 | 4/4 | 1.25 |
| k | 82 | 830 | 10.0 | 6/17 | 2.04 |
| l | 92 | 640 | 6.9 | 5/13 | 1.84 |
| m | 81 | 400 | 5.0 | 6/8 | 1.36 |
| n | 59 | 180 | 3.1 | 4/3 | 1.17 |
| o | 68 | 205 | 3.0 | 4/4 | 1.25 |

[1]The number of arms calculated as arms-T/the number of arms calculated as arms-Mw.
[2]The Intrinsic Viscosity in dl/g as measured in the SEC-DV experiment.

Preparation of a Nanogel Structure

EXAMPLE 3A

Polymer B-4 dissolved in toluene was mixed with $H_2PtCl_6 \cdot 6H_2O$ dissolved in isopropanol at a molar ratio of 1000/1. A polymethylhydrosiloxane containing an average of 50 Si—H groups per molecule was added to the reaction mixture to provide a molar ratio of Si—H to C=C in Polymer B-4 of 5/1. The reaction mixture was stirred at 90° C. for 3 days. Then, 1,7-octadiene in a 1/1 molar ratio to the C=C in Polymer B-4 was added and the reaction continued. After 2 days the reaction was blocked with an excess of 1-octene. The polymer recovered after evaporation of the solvent under vacuum at 80° C. was analyzed by SEC-DV to contain 5 arms and the data shown in Table 3.

EXAMPLE 3B

Polymer B-4 dissolved in toluene and $H_2PtCl_6$ $6H_2O$ dissolved in isopropanol were mixed in a molar ratio of 1000/1. A PMHS containing an average of 50 Si—H groups per molecule was added to the reaction mixture to provide a molar ratio of Si—H to C=C in Polymer B-4 of 5/1. Additionally, Tetramethyltetravinylcyclotetrasiloxane (TMTVS) was added to the reaction mixture to provide a molar ratio of C=C (in TMTVS) to Si—H in PMHS of 0.3. The reaction mixture was stirred at 90° C. for 3 days. After 3 days, the reaction was blocked with an excess of 1-octene. The polymer recovered after evaporation of the solvent under vacuum at 80° C. was analyzed by SEC-DV to contain 30 arms and the data shown in Table 3.

EXAMPLE 3C

Conditions of Example 3B were repeated with Polymer B-5 and with the exception that TMTVS was added at a molar ratio of C=C (in TMTVS) to Si—H in PHMS of 0.1. The polymer recovered after evaporation of the solvent under vacuum at 80° C. was analyzed by SEC-DV to contain 6 arms and the data shown in Table 3.

TABLE 3

Nanogel Branched Polymers Prepared by Hydrosilation

| Example 3-# | Polyolefin prearm | | Coupling Reaction | | Branched Polyolefin Polymer | | | | |
|---|---|---|---|---|---|---|---|---|---|
| | Polymer # | C2 mole % | PMHS[1] | CE[2] | Mn kg/mol | Mw kg/mol | MWD | # arms[3] T/Mw | IV[4] |
| a | B-4 | 60 | 50 | 78 | 64 | 230 | 3.6 | 5/5 | 1.06 |
| b | B-4 | 60 | 50 | 67 | 310 | 1350 | 4.4 | 30/30 | 1.39 |
| c | B-5 | 60 | 32 | 87 | 79 | 255 | 3.3 | 5/6 | 1.18 |

[1]The average molar content of Si-H groups per molecule of polymethylhydrosiloxane; PMHS 32 has a Mn of 1920, PMHS 50 has a Mn of 3000.

TABLE 3-continued

Nanogel Branched Polymers Prepared by Hydrosilation

| Example 3-# | Polyolefin prearm Polymer # | $C_2$ mole % | Coupling Reaction PMHS[1] CE[2] | Branched Polyolefin Polymer Mn kg/mol | Mw kg/mol | MWD | # arms[3] T/Mw | IV[4] |
|---|---|---|---|---|---|---|---|---|

[2]The Coupling Efficiency defined as the percent of polyolefin prearms chemically bound to the PMHS.
[3]The number of arms calculated as arms-T/the number of arms calculated as arms-Mw.
[4]The Intrinsic Viscosity in dl/g as measured in the SEC-DV experiment.

Preparation of Oil Solutions and Testing as a Viscosity Index Improver

EXAMPLE 4

The comb and nanogel branched polymers prepared in Examples 2 and 3 were dissolved in an oil blend consisting of a 1/9 weight ratio of SNO-100 (a solvent neutral oil having a SUS at 100° F. of 100) and SNO-130 (a pour depressed solvent neutral oil having a SUS at 100° F. of 130) under nitrogen in a glass reactor with mechanical stirring. The Polymer Content in the oil blend was adjusted to obtain approximately a 6.5 cSt TP as the solution viscosity. The Polymer Contents (PC, %) are summarized in Table 4 along with results for Thickening Power (TP, cSt), Shear Stability Index (SSI, %), Cold Cranking Simulator (CCS, cP), and Mini-Rotoviscometer (MRV, cP)

The results were compared to those obtained under the same test conditions with three commercial shear stable viscosity index improvers (VII). Comparative VII-1 was a star polymer sold as Shell Vis 250 (Shell Vis is a registered trademark of Shell International chemical Company Ltd.). Comparative VII-2 was a linear ethylene-propylene copolymer sold as Paratone 8000 by Paramins. Comparative VII-3 was a linear ethylene-propylene copolymer sold as TLA 525 by Texaco Additive Company.

TABLE 4

Properties of Branched Polymers in Oil

| Polymer # | TP (cSt) | PC (%) | SSI (%) | CCS (cP) | MRV (cP) |
|---|---|---|---|---|---|
| 2a | 7.0 | 1.2 | 31 | 3319 | 22000 |
| 2b | 6.9 | 1.2 | 34 | 2678 | 13440 |
| 2c | 6.3 | 1.5 | 24 | 3062 | 13570 |
| 2d | 6.3 | 1.5 | 24 | 3062 | 13110 |
| 3a | 6.5 | 1.3 | 25 | 3300 | 16500 |
| 3b | 6.5 | 1.0 | 42 | 3050 | 20200 |
| 2e | 6.9 | 1.1 | 22 | 3450 | 19000 |
| 2f | 6.8 | 1.0 | 41 | 2750 | 9500 |
| 3c | 6.3 | 1.3 | 26 | 3300 | 22000 |
| 2g | 6.4 | 1.7 | 24 | 3450 | 17000 |
| 2h | 6.4 | 1.2 | 25 | 3400 | 27000 |
| 2i | 6.9 | 1.2 | 25 | 3250 | — |
| 2j | 6.3 | 1.2 | 24 | 3200 | — |
| 2k | 6.8 | 0.6 | 63 | 2700 | 6800 |
| 2l | 6.8 | 0.9 | 63 | 2700 | — |
| 2m | 7.1 | 1.0 | 42 | 3050 | 11000 |
| 2n | 6.6 | 1.2 | 25 | 3250 | — |
| 2o | 6.4 | 1.1 | 28 | 3250 | — |

TABLE 4-continued

Properties of Branched Polymers in Oil

| Polymer # | TP (cSt) | PC (%) | SSI (%) | CCS (cP) | MRV (cP) |
|---|---|---|---|---|---|
| ComparativeVII-# | | | | | |
| -1 | 6.5 | 1.3 | 10 | 3150 | 16200 |
| -2 | 6.6 | 1.6 | 24 | 3400 | 15500 |
| -3 | 6.5 | 1.6 | 24 | 3900 | 24000 |

The branched polyolefins for this invention have oil solution properties equivalent to or beter than the typical commercial viscosity index improvers.

EXAMPLE 5 a) The procedure of Example 2 is repeated using 7 g Polymer A in 70 ml toluene and a Polymethylhydrosiloxane with 32 Si—H groups per molecule at a 5/1 molar ratio of Si—H to C═C in Polymer A The reaction is stirred at 90° C. for 96 hours, after which a branched polymer with 10 arms is recovered.

b) The procedure of Example 5a is repeated except that the PMHS has 50, Si—H groups per molecule, 25 g Polymer A in 250 ml toluene is used and the reaction is heated 90° C. for 72 hrs. A branched polyolefin with 6 arms is recovered.

EXAMPLE 6

Polymer C, a terminally unsaturated Polyethylene, dissolved in xylene and $H_2PtCl_6 \cdot 6H_2O$ dissolved in tetrahydrofuran were mixed at a molar ratio of 1000/1. The Polymethylhydrosiloxane of Example 1 dissolved in toluene was added to provide a molar ratio of Si—H to C═C in Polymer C of 5/1. The resulting mixture was stirred at 110° C. for 4 days. Polymer recovered after evaporation of the solvent at 80° C. under vacuum analyzed to contain 4 arms.

EXAMPLE 7

Polymer D, a terminally unsaturated Polypropylene, was reacted according to the procedure of Example 6. The recovered polymer was analyzed to contain 8 arms.

EXAMPLE 8

Polymer E, a terminally unsaturated terpolymer, was reacted according to Example 6 with the following exceptions: $Pt(PPh_3)_4$ dissolved in toluene was employed as the catalyst and the reaction mixture was stirred at 90° C. for 14 days. The recovered polymer was analyzed to contain 6 arms.

Preparation of Silane Terminated Polyolefin and its Polymerization to Produce a Polysiloxane Backbone with Polyolefin Arms

EXAMPLE 9

Polymer A dissolved in toluene was mixed with $HSiCl_3$ (trichlorosilane) dissolved in toluene at a molar ratio of 1 C=C in Polymer A per 30 Si—H. $H_2PtCl_6.6H_2O$ dissolved in isopropanol was added to the reaction mixture at a mole ratio of 0.012/C=C. The reaction was allowed to stir at 25° C. for 2 days, then polymer was recovered by evaporation of the solvent and excess trichlorosilane at 80° C. under vacuum.

The recovered polymer was then redissolved in toluene. 3 Moles of butanol were added and reaction was allowed to proceed with stirring for 1 day at 60° C. After the addition of excess water, the mixture was stirred for 1 additional day. The recovered polymer contained 20 arms.

Hydroxy and Amine Derivatization of Terminally Unsaturated Polyolefins

EXAMPLE 10

(a) Polymer A dissolved in tetrahydrofuran and 9-Borabicyclo[3.3.1] nonane (9-BBN) dissolved in tetrahydrofuran were mixed in a 1/1 molar ratio of B—H to C=C in Polymer A. The reaction mixture was stirred at 40° C. for 2 hours.

(b) The above reaction mixture was cooled to 0° C. Sodium hydroxide (6M in water, oxygen free) and hydrogen peroxide (30% in water) were added both in a molar ratio of ingredient to C=C in Polymer A of 1.9/1 and 7.5/1, respectively. This mixture was then heated to 50° C. and the temperature maintained for 2 hours while stirring. The organic solvent was removed by evaporation and the resulting mixture was dissolved in petrol. After separation of the layers, the organic layer was washed with 5% HCL solution and then three times with water. The Petrol was evaporated to recover the hydroxy terminated Polymer A (Polymer A-OH) which was subsequently dried at 60° C. under vacuum.

(c) A reaction mixture prepared according to procedure (a) above was treated at a 1/1 molar ratio of C=C in Polymer A to N in ammonium hydroxide with $NH_4OH$ solution (25 wt %, oxygen free) at room temperature. A solution containing an equimolar quantity of NAOCl (13 wt % active Cl, oxygen free) was then slowly added and the resulting reaction mixture was stirred for an additional 3 to 4 hours. The organic solvent was evaporated and Petrol added to dissolved the polymer. Three equivalents of methanol were added to precipitate the polymer. The amine terminated Polymer A (Polymer A-$NH_2$)was recovered by filtration and dried under vacuum at 60° C.

(d) Polymer B6 dissolved in tetrahydrofuran is reached according to Example 10a with the exception that the reaction is stirred for 4 hours, before proceeding with the steps in Example 10b. The Petrol is evaporated to recover the hydroxy terminal Polymer B6 (Polymer B6-OH) which is subsequently dried at 60° C. under vacuum.

(e) Polymer B6 dissolved in tetrahydrofuran is reacted according to Example 10a for 4 hrs, before proceeding with the steps in Example 10c. The amine terminal Polymer B6 (Polymer B6-$NH_2$) is recovered by filtration and dried under vacuum at 60° C.

Reaction of Hydroxy or Amine Terminal Polyolefin with Polyacrylyl Chloride

EXAMPLE 11

(a) Polymer A-OH, prepared according to example 10(b), was dissolved in tetrahydrofuran and mixed with polyacrylyl chloride (Mw=2000) dissolved in tetrahydrofuran to provide a molar ratio of —OH in Polyolefin to polyacrylyl chloride of 1/0.065. A catalytic amount of pyridine was added and the solution stirred at 50° C. for 5 days. Polymer recovered after evaporation of the solvent at 80° C. under vacuum measured 18 arms. The polyolefin arms were linked via ester groups.

(b) Polymer A-$NH_2$, prepared according to example 10(c), is dissolved in tetrahydrofuran and is reacted with polyacrylyl chloride (Mw=2000) as in the above example 11(a). A 19 arm polyolefin branched polymer is recovered. The polyolefin arms are linked via amide groups.

Free Radical Polymerization of Methacrylate Terminated Polyolefin

EXAMPLE 12

(a) Polymer A-OH, prepared according to example 10(b), was dissolved in methylene chloride and reacted with an excess of methacrylyl chloride in the presence of a catalytic amount of pyridine by stirring at room temperature for 3 days. The methacrylate terminated polyolefin (Polymer A-O-MA) was recovered and purified by conventional techniques.

(b) The methacrylate terminated polyolefin was dissolved in tetrahydrofuran and mixed with dicumyl peroxide at a molar ratio of 1/0.16 C=C/peroxide. The solution was heated at 200° C. for 3 hours. The solvent was evaporated at 80° C. under vacuum and the residue dissolved in petrol. Methanol was added to precipitate polymer which after drying under vacuum at 60° C. was analyzed to contain 29 arms. The polyolefin arms were linked via ester groups.

Copolymerization of a Methacrylate Terminated Polyolefin with Ethylene Glycoldimethacrylate

EXAMPLE 13

The methacrylate terminated Polymer B1 (Polymer B1-O-MA) was prepared according to the steps of Example 10a, b, and 12a and purified. This polymer was dissolved in tetrahydrofuran and methyl methacrylate and ethylene glycol dimethacrylate added in a molar ratio of acrylate monomer to Polymer B1-O-MA of 16/1 and 3/1, respectively. Azobisisobutyronitrile was added to the reaction mixture at a more ratio of 0.16/1 C=C in polymer. The mixture was then heated at 60° C. for 72 hours. The solvent was evaporated at 80° C. under vacuum to recover the branched polymer which by SEC-DV analysis showed 123 arms.

Copolymerization of Borated Polyolefin with Methacrylate Monomers

EXAMPLE 14

Polymer B2 was dissolved in tetrahydrofuran and mixed with 9-BBN also dissolved in tetrahydrofuran at a molar ratio of 1/1, B—H per C=C in Polymer B2. This mixture was heated at 40° C. and stirred for 2 hours. Next methyl methacrylate and ethylene glycol dimethacrylate were added in a molar ratio of acrylate monomer to Polymer B2 of 100/1 and 10/1, respectively. To this solution was added oxygen in 5 increments. The mixture was then heated to 50° C. and stirred for 24 hours. The solvent was evaporated at 80° C. under vacuum. The resulting branched copolymer was measured to have 52 arms.

Polyalkenylene Amine Dendrimer with Polyolefin Arms

EXAMPLE 15

(a-1) Preparation of Maleic Anhydride Terminated Polyolefin

Polymer A dissolved in toluene was treated with 9-BBN also dissolved in toluene at a 1:1 molar ratio of C=C in Polymer A to B—H bonds. This mixture was heated to 40° C. and stirred at temperature for 2 hours. Afterwards, maleic anhydride was added to the hot reaction mixture at a molar ratio of 1:1 based on moles C=C in starting Polymer A. Air was admitted to the reaction vessel and the mixture stirred at 50° C. for 2 days. A maleic anhydride terminated Polymer A (Polymer A-MAh) was recovered after purification.

(a-2) Polymer B6 dissolved in toluene is reacted according to the above procedure to recover a maleic anhydride terminated Polymer B6 (Polymer B6-Mah).

(b) Reaction of Polymer A-Mah with Amine Terminal Dendrimer

To the purified Polymer A-MAh dissolved in tetrahydrofuran a second generation Dendrimer, DAB $(PA)_4(PA)_8$, prepared from 1,4-diaminobutane, and 2 generations of acrylonitrile and hydrogen according to Examples I through IV of WO 93/14147, was added at a ratio of 1:1 molar ratio of MA group attached to Polymer A to —$NH_2$ group of the Dendrimer. The reaction mixture was heated to 50° C. and the temperature maintained there while stirring for 18 hours. The solvent was evaporated and the residue dissolved in m-xylene. The m-xylene solution was heated to 160° C. with removal of water via the azeotrope in order to force the coupled product to the imide form. After 5 hours water removal was complete and the m-xylene was evaporated under vacuum at 80° C. The resulting branched polymer, $DAB(PA)_4(PA)_8(Mah)_8(Polymer\ A)_8$ is characterized by SEC-DV to have 8 arms.

(c) Reaction of Polymer B6-Mah with Amine Terminal Dendrimer

Reaction (b) is repeated with Polymer B6-Mah and Dendrimer, $DAB(PA)_4(PA)_8$ with the expection of stirring for 48 hours at 80° C. The resulting branched polymer $DAB(PA)_4(PA)_8(Mah)_8(Polymer\ B6)_8$ is characterized by SEC-DV to have 8 arms.

Isocyanate Backbone with Polyolefin Arms

EXAMPLE 16

Polymer A was converted to a Polymer A-OH via the procedure of Example 10a, b, and dissolved in tetrahydrofuran. Tolonate HDT, a tri-isocyanate formed by trimerization of 1,6-diisocyanato hexamethylene, was dissolved in tetrahydrofuran and added at a molar ratio of ½ trimer molecules per Polymer A-OH. A catalytic amount of dibutyltinlaurate was added to the reaction which was then heated to 50° C. with stirring for 6 hours. Then pentaerythritol dissolved in tetrahydrofuran was added to the reaction mixture at a molar ratio of 0.125/1 of hydroxy terminal Polymer A. This mixture was stirred an additional 12 hours. Branched polymer recovered from the reaction was analyzed to have 8 polyolefin arms linked via urethane bonds.

Diaminodiphenylamine Terminal Dendrimer with Polyolefin Arms

EXAMPLE 17

(a) Preparation of Dendrimer terminated with 4,4'-diaminodiphenylamine

Dendrimer, $AEB(PA)_6$ is prepared from 1,3,5 tri (aminoethyl) benzene as core and one generation of acrylonitrilelhydrogen according to Example 1-II of WO 93/14147. The six terminal amino groups of $AEB(PA)_6$ are reacted with excess methylacrylate according to the procedure of Example C of U.S. Pat. No. 4,587,329 at a mole ratio of 21 methacrylates to 1 Dendrimer to give the $AEB(PA)_6$ $(MA)_{12}$. This Dendrimer is dissolved in methanol and 4,4'-diamino, diphenyl amine (DADPA) in methanol is mixed at a molar ratio of 2.5 diamine/per mole of ester groups. The mixture is held at room temperature and stirred for 60 hours. The excess diamine and methanol are removed by vacuum distillation. The residue analyzed for —CONH-groups and no residual —$CO_2CH_3$ and is used directly in (c).

(b) Preparation of Tosylate Terminated Polyolefin

Polymer B6-OH is prepared according to Example 10d and purified. It is then dissolved in toluene. Pyridine is added at a mole ratio of 10 moles per mole of OH in Polymer B6-OH. Then p-Toluenesulfonyl chloride is slowly added at a mole ratio of 1.5 mole per mole of OH. This mixture is stirred at room temperature for 24 hours, then is treated with an equal volume of HCl and ice, 1:1. The layers are separated, the toluene solution washed with water, and the Tosylate terminated Polymer B6 (Polymer B6-OTos) is recovered by removal of solvent under vacuum at 30° C.

(c) Reaction of Polymer B6-OTos with $(AEB)(PA)_6(MA)_{12}$ $(DADPA)_{12}$

The Dendrimer dissolved in tetrahydrofuran and Polymer B6-OTos also dissolved in tetrahydrofuran are mixed and heated to 10° C. for 36 hours. The solution is then cooled to room temperature and enough aqueous KOH is added to make the mixture basic. The layers are separated and the tetrahydrofuran is evaporated under vacuum at 80° C. The resulting branched Polymer B6 is analyzed to have 12 polyolefin arms linked via an amine group.

(d) Preparation of $(AEB)(PA)_6(MA)_{12}(DAOPA)_{12}(EP)_{12}$

The above reaction sequence a, b, c is repeated with Polymer A to produce a 12 arm Polymer A linked via an amide group to the Dendrimer $(AEB)(PA)_6(MA)_{12}$ $(DADPA)_{12}$.

Polymerization of Vinylurea Terminated Polyolefin

EXAMPLE 18

(a) Reaction of Amine Terminal Polymer A with Vinyl Isocyanate

Polymer A-$NH_2$ is prepared according to the procedure of Example 10a, c. The purified Polymer A-$NH_2$ is dissolved in dry toluene and mixed with m-isopropenyl-α,α-dimethylbenzyl isocyanate dissolved in dry toluene at a 1:1 molar ratio of Polymer A-$NH_2$ to —NCO. Dibutyl tindilaurate is added as catalyst at a concentration of 0.15 mole % of reactants. The mixture is warmed to 35° C. and stirred for 6 hours or until disappearance of the NCO peak in the infrared spectra. The vinylurea Polymer A is precipitated with methanol and dried under vacuum at 50° C.

(b) Free Radical Polymerization

The vinylurea Polymer A is redissolved in dry toluene. Styrene and methyl methacrylate are added at a molar ratio of 5/1 and 10/1 monomer to vinyl polymer, respectively. Azoisobutyronitrile at a molar ratio of 0.15/1 of monomers is added and the reaction is heated to 60° C. Stirring is continued for 24 hrs. after which the solvent and any unreacted monomer is evaporated. The residue is dissolved in petrol and precipitated in methanol. The branched polymer is dried under vacuum at 60° C. and analyzed to have 33 polyolefin arms.

Reaction of SMA Polymer with Polymer A-NH$_2$

EXAMPLE 19

Polymer A-NH$_2$ is prepared by the procedure of Example 10a, c. Purified Polymer A-NH$_2$ is then dissolved in tetrahydrofuran and mixed with a styrene/maleic anhydride copolymer (Maleic anhydride content 30 wt %, Mn=20,000) also dissolved in tetrahydrofuran at a molar ratio of anhydride groups to amine groups of 2/1. The reaction mixture was heated to 60° C. and stirred for 5 days. The solvent is evaporated and the residue is dissolved in m-xylene. The m-xylene solution is heated to 160° C. and water removed as the azeotrope to force the reaction to the imide form. After 7 hours the m-xylene was evaporated under vacuum at 80° C. The resulting polymer is characterized by SEC-DV to have 30 arms.

Poly(Vinyl Formal) with Polyolefin Arms

EXAMPLE 20

Polymer B2-OTos is prepared according to the procedure of Examples 10a, b, 17c, and dissolved in tetrahydrofuran. A poly(vinyl formal) (acetalization 60 mol %, alcohol 35 mol %, Mn=10,000) is also dissolved in THF. The two solutions are mixed to provide a mole ratio of alcohol functionality to tosylate groups of 15/1. This mixture is stirred at 80° C. for 5 days. The solvent is removed under vacuum and the residue is analyzed by SEC-DV to have a branched polyolefin with 12 arms.

Polyester Amine Dendrimer with Polyolefin Arm

EXAMPLE 21a

Tris(aminoethyl) benzene, AEB, and 25 percent excess methyl itaconate (MI) are reacted in methanol at 40° C. according to the procedure outlined in Example 1 of WO 93/14147 for 24 hours. The AEB(MI)$_6$ half generation dendrimer is recrystallized from methanol after removal of excess MI and methanol by vacuum distillation.

The AEB(MI)$_6$ is dissolved in tetrahydrofuran and is mixed with Polymer B6-OH also dissolved in tetrahydrofuran at a molar ratio of 1/12, respectively. The solution is stirred at 100° C. for 48 hours. The temperature is then reduced to 60° C. and the solvent is evaporated under vacuum. The resulting branched polymers are analyzed to have 12 arms linked via an ester group.

EXAMPLE 21b

Preparation of the AEB(MI)$_6$ backbone is repeated as in 21a and its solution in tetrahydrofuran is added Polymer A-OH at a molar ratio of 12/1, Polymer A-OH to backbone. The solution is stirred 24 hours at 80° C. The solvent is evaporated under vacuum while maintaining a temperature of 60° C. The resulting branched polymer AEB(MI)$_6$(Polymer A)$_6$ is analyzed to have 12 arms linked via ester groups.

Isocyanate Terminal Dendrimer with Amine Terminal Polyolefin

EXAMPLE 22

TMI and methyl-ethyl ketoxime (MEK) are mixed in a 1:1 molar ratio in a flask maintaining the temperature at 40° C. by slow addition of the ketoxime. Potassium octanate (0.1 wt % based on solid wt. of reactants) dissolved in xylene is added to the mixture and the temperature increased to 85° C. The temperature is maintained at 85° C. for 1–½ hours then reduced to 30° C. The amine terminal dendrimer, DAB(PA)$_4$(PA)$_8$ dissolved in xylene is added to the xylene solution of TMI-MEK at a molar ratio of 1/8, respectively. The reaction mixture is maintained at 50° C. for 20 hours. The solvent is evaporated and the blocked isocyanate dendrimer DAB(PA)$_4$(PA)$_8$(TMI-B) is recrystallized from methanol.

The DAB(PA)$_4$(PA)$_8$(TMI-B)$_8$ is heated under vacuum at 10 mm Hg with a nitrogen purge at 130° C. for 30 minutes to effect deblocking. The temperature is reduced to ambient and the DAB(PA)$_4$(PA)$_8$(TMI) dissolved in xylene. Polymer A-NH$_2$ dissolved in xylene is added to the dendrimer at a molar ratio of 8/1, respectively. The solution is heated to 50° C. and stirred fro 24 hours. The solvent is evaporated under vacuum and recovered polymer analyzed to have 8 arms linked via urea bond.

Reaction of Hydroxy Terminal Polyolefin with Extended Isocyanate Backbone

EXAMPLE 23a

The trifunctional isocyanurate of toluene disocyanate (TDI) is dissolved in tetrahydrofuran (THF) and is slowly added to a reaction flask under nitrogen simultaneously with slow addition of a trimethylolpropane (TMP) solution in THF. The reactants are mixed at a ratio of 3 moles TMP to 1 mole TDI isocyanurate over a period of 1.5 hours, after which a catalytic amount of tin octanoate is added. The solution is stirred under nitrogen for an additional three hours at 80° C. The solution from this reaction is transferred under N$_2$ to a second addition vessel for slow mixing in a reaction flask with a solution of toluene diisocyanate (TDI) dissolved in THF. The TDI and the first reaction solution are mixed at a mole ratio 6 to 1 over a period of 1.5 hours. A second addition of tin octanoate is made and the solution is warmed to 60° C. Stirring at 60° C. is continued for two hours. The mixture is cooled to room temperature and Polymer A-NH is added at a ratio of 6/1 Polymer A-NH to initial Isocyanurate. The reaction mixture is warmed to 60° C. and is stirred for two days. The THF is removed under vacuum and the residue dissolved in hexane at 30° C. Methanol is added slowly to precipitate the polymer. The precipitate is collected and is dried under vacuum at 80° C. The branched polymer is characertized by SEC-DV to have 6 arms.

EXAMPLE 23b

The above reaction sequence is repeated for preparation of the extended isocyanate in THF and to the room temperature solution is added Polymer B6—NH at a ratio of 6/1 Polymer B6—NH to initial TDI Isocyanurate. The THF solution is warmed for 3 days at 60° C. with stirring after which the reaction is worked up as described above. The branched polymer is characterized by SEC-DV to have 9 arms.

Preparation of Oil Solutions and Testing as a Viscosity Index Improvers, Dispersants

EXAMPLE 24

The branched polyolefin polymers of the preceeding Examples are dissolved in lubricating oil according to the procedure of Example 4 and tested for Thickening Power, Polymer Content, and Shear Stability Index. The data is explained below in Table 5A. Oil concentrates of some of the Branched polymers are also blended into a standard 5W-30 engine oil formulation and are tested for Bench VC (BVC) dispersion as an indication of engine dispersancy performance as explained in Table 5B.

TABLE 5A

Branched Polyolefins as Viscosity Index Improvers

| | Polyolefin Arms | | | Branched Polyolefin Polymer | | | | | |
|---|---|---|---|---|---|---|---|---|---|
| Example 24 | # | $C_2$ Mole % | Mn kg/mol | Example # | Mn kg/mol | Arms # | TP cSt | PC % | SSI % |
| a | C  | 100 | 16  | 6   | 66.9 | 4   | 6.4 | 1.2 | 18 |
| b | D  | 0   | 5.5 | 7   | 46.9 | 8   | 6.6 | 4.1 | 4  |
| c | E  | 66  | 21  | 8   | 195  | 6   | 6.6 | 2.0 | 16 |
| d | B1 | 64  | 28  | 13  |      | 123 | 6.6 | 0.9 | 32 |
| e | B1 | 64  | 28  | 14  |      | 52  | 6.5 | 1.2 | 24 |
| f | A  | 55  | 1.3 | 15b | 12   | 8   | 6.5 | 4.1 | 7  |
| g | B6 | 55  | 16  | 15c | 129  | 8   | 6.6 | 1.4 | 18 |
| h | B6 | 55  | 16  | 17c | 195  | 12  | 6.5 | 1.3 | 15 |
| i | A  | 55  | 1.3 | 17d | 19   | 12  | 6.5 | 3.5 | 5  |
| j | A  | 55  | 1.3 | 18  |      | 33  | 6.5 | 2.9 | 2  |
| k | A  | 55  | 1.3 | 19  | 60   | 30  | 6.5 | 2.9 | 5  |
| l | B2 | 64  | 24  | 20  | 298  | 12  | 6.6 | 1.4 | 18 |
| m | B6 | 55  | 16  | 21a | 193  | 12  | 6.5 | 1.5 | 16 |
| n | A  | 55  | 1.3 | 21b | 16.8 | 12  | 6.5 | 3.5 | 5  |
| o | A  | 55  | 1.3 | 22  | 13   | 8   | 6.5 | 4.7 | 4  |
| p | A  | 55  | 1.3 | 23a | 10   | 6   | 6.5 | 4.4 | 6  |
| q | B6 | 55  | 16  | 23b | 98   | 6   | 6.6 | 1.5 | 20 |

TABLE 5B

Branched Polyolefins as Dispersant in Lub Oil

| Example 24 | Example # | Mn Kg/mol | # arms | N wt % | N-Chem Bond | BVC |
|---|---|---|---|---|---|---|
| aa | 15b | 12   | 8  | 1.6  | imide/amine   | 30  |
| bb | 15c | 129  | 8  | 0.15 | amide/amine   | 44  |
| cc | 16  | 11.8 | 8  | 2.9  | urea/amide    | 32  |
| dd | 17c | 196  | 12 | 0.3  | amine/amide   | 42  |
| ee | 17d | 19   | 12 | 3.2  | amine/amide   | 37  |
| ff | 18  | —    | 33 | —    | urea          | 90  |
| gg | 19  | 60   | 30 | 0.7  | imide         | 38  |
| hh | 20  | 298  | 12 | 0    | —             | 100 |
| ii | 21a | 193  | 12 | .02  | amine         | 60  |
| jj | 21b | 16.8 | 12 | 0.25 | amine         | 32  |
| kk | 22  | 13   | 8  | 3.0  | urea/.amine   | 35  |
| ll | 23a | 10   | 6  | 3.4  | urea/uethane  | 35  |
| mm | 23b | 98   | 6  | 0.3  | urea/urethane | 47  |

EXAMPLE 25

Derivatization of Branched Polyolefins (a) Grafting under Free Radical Conditions (a-1) 100 g neat Branched Polyolefin from Example 5a is charged to a one gallon stainless steel pressure reactor equipped with a treble hook type stirrer. Maleic anhydride, 10 g solid, is also charged along with the Branched Polyolefin. The reactor is sealed and flushed three times with dry nitrogen, then vented to a final pressure of 20 psig. The mixture is stirred and heated to 155° C. Dicumyl peroxide (3 g dissolved in 15 ml toluene) is added to the reactor by means of a pressure bomb and the resulting mixture is stirred for approximately 60 mins at 155° C. maintaining a nitrogen pressure. The temperature is reduced to approximately 25° C. while maintaining a nitrogen purge of the reactor. The resulting grafted branched polyolefin is analyzed by titration to measure 9.1 weight percent bound maleic anhydride on the 10 arm structure (Branched Polyolefin 5a-g-Mah).

(a-2) The above reaction is repeated with Branched Polyolefin from Example 5b except that 5 g maleic anhydride, 1.5 g dicumyl peroxide in 10 ml toluene are substituted. The resulting grafted branched polyolefin is analyzed by titration to measure 4.8 wt % bound maleic anhydride on the 6 arm structure (Branched Polyolfin 5b-g-Mah).

(b) Reaction of Branched Polyolefin-g-Mah with Polyamines

The product from 25a-1 is charged to the pressure vessel along with 100 g of toluene. The pressure vessel is flushed with nitrogen 3 times, is vented to 20 psig; and is heated to 155° C. A solution of N,N-dimethylaminopropylamine (DMAPA), 10.4 g in 30 ml of toluene, is pressured into the reactor. The resulting mixture is stirred under nitrogen purge to remove water with heating for 12 hours. The solution is cooled to 80° C. then filter through Celite and the resulting product is isolated by evaporation of the toluene and is analyzed to have a bound nitrogen content of 2.4 wt %. The 10 arm derivatized Branched Polyolefin, 5a-g-Mah (DMAPA) in toluene solution is tested as a detergent, dispersant fuel additive.

(c) The sequence of reactions, 25a and 25b, is carried out with Branched Polyolefin from Example 5a with the exception that a solution of 13.3 g 4-(2-aminoethyl) morpholine (AEM) in 30 ml toluene is used instead of DMAPA. The resulting product offer isolation from the toluene is analyzed to have a bound nitrogen content of 2.3 wt %. The 10 arm derivatized branched polyolefin, 5a-g-Mah (AEM) in toluene solution is tested as a detergent, dispersant fuel additive.

(d) The sequence of reaction 25a, 25b is caried out with Branched Polyolefin from Example 5a with the exception that a solution of 20 g of tetraethylenepentaamine (TEPA) is used instead of DMAPA. The resulting product after isolation from the toluene is analyzed to have a bound nitrogen content of 5.5 wt %. The 10 arm derivatized branched polyolefin, 5a-g-Mah (TEPA), in toluene solution is tested as a detergent, dispersant fuel additive.

(e) The product from 25a-2 is reacted with 10 g TEPA in 30 ml of toluene according to procedure 25b. The resulting product is isolated by evaporating of the toluene and Is analyzed to have a bound nitrogen content of 3.1 wt %. The 6 arm derivatized Branched Polyolefin 5a-2-g-Mah (TEPA) in toluene solution is tested as a detergent, dispersant additive.

(f) The product as prepared in 25a-2 is reacted with 10.7 g polyoxyethylene propylene diamine, (PEPD) (prepared according to the Examples of U.S. Pat. No. 5,366,518) containing 30 wt % ethylene oxide, according to the procedure of 25b. The derivatized Branched Polyolefin 5a2-g-Mah (PEPD) is analyzed to have a nitrogen content of 0.1 wt % and an oxygen content of 0.3 wt % and is tested as a detergent, dispersant additive.

(g) The product as prepared in 25a-2 is reacted with 9.4 g of N-phenyl-p-phenylene diamine (NPPDA) in 30 ml of toluene according to procedure 25b. The derivatized 6 arm Branched Polyolefin, 5a2-g-MAH (NPPDA) is analyzed to have a nitrogen content of 0.1 wt % and is tested as a detergent, dispersant additive.

EXAMPLE 26

Engine tests are carried out using commercial regular unleaded gasoline to measure deposits on intake valves and combustion chambers using this fuel with and without the branched polyolefin fuel additives. The test engine is a 2.3 liter, Port Fuel Injected, dual spark plug, four-cylinder engine manufactured by Ford Motor Company. The test engine is operated for 100 hours as specified for Intake Valve testing by the Coordinating Research Council. At the end of a test the intake valves are removed, washed with hexane, and weighed. The difference in weight of the clean valves is the Intake Valve Deposit (IVD). Likewise for each cylinder, the piston top and mating surface of the lead is scraped to collect deposits. The amount weighed is the Combustion Chamber Deposit (CCD).

The branched polyolefins and derivatized branched polyolefin dispersant, detergent additives are dissolved in xylene at a concentration of 50 weight %. The xylene solution is blended into regular unleaded gasoline to give the concentration in ppm of additive as indicated in Table 6. Results of engine tests are estimated in Table 6.

TABLE 6

Branched Polyolefins as Fuel Additives

| Branched Polyolefin | | | Average Weight per Cylinder | |
| --- | --- | --- | --- | --- |
| Example # | N, Wt. % | ppm | IVD (mg) | CCD (mg) |
| Control[1] | — | 0 | 420 | 950 |
| 15b | 1.6 | 200 | 80 | 1100 |
| 16 | 2.9 | 150 | 150 | 1120 |
| 17d | 3.2 | 200 | 85 | 1100 |
| 19 | 0.7 | 250 | 105 | 1130 |
| 21b | 0.25 | 250 | 130 | 1150 |
| 22 | 3.0 | 250 | 105 | 1100 |
| 23a | 3.4 | 250 | 115 | 1150 |
| 25b | 2.4 | 200 | 95 | 1120 |
| 25c | 2.3 | 200 | 90 | 1110 |
| 25d | 5.5 | 200 | 80 | 1100 |
| 25e | 3.1 | 200 | 90 | 1100 |
| 25f | 0.1 | 200 | 80 | 1100 |
| 25g | 0.1 | 200 | 85 | 1100 |

[1]Control is unleaded gasoline with no dispersant, detergent additives.

EXAMPLE 27

Derivatization of Branched Polyolefins for Use as a Dispersant VII Additive in Lubricating Oil (a) Branched Polyolefin from Examples 2e (200 g) was mixed with 200 g dry hexane and 3.3 g maleic anhydride in a pressure reactor to provide 50 wt % solution of the polymer. This mixture was flushed with nitrogen and then heated with stirring to 155° C. Dicumyl peroxide (1.67 g in 25 cc hexane) was pressured into the reactor and the mixture was stirred at temperature for 60 minutes. Analysis by titration of the grafted Branched Polyolefin isolated from a portion of the hexane solution measured 0.8 wt % bound maleic anhydride on a total polymer basis.

The hexane solution was combined with enough SNO-100 oil to give a polymer content of 13.4 wt %, after the hexane was removed. Hexane was removed using a vacuum rotary evporator operated at 160° C., then the 300 g of the oil solution of Branched Polymer 2e-g-Mah was placed in a resin flask reactor equipped with a mechanical stirrer and a heating mantle. The solution was heated to 160° C., with stirring, under a nitrogen atmosphere. A solution of 1.02 g NPPDA in 2.4 g Surfonic L24-7 (product of Huntsman Corporation) was added and reaction is continued for 16 hours. Analysis of the derivatized 6 arm Branched Polyolefin 2e-g-Mah(NPPDA) showed a bound NPPDA level of 1.0 wt %.

The oil concentrate,was blended into a 5W-30 engine oil formulation and tested for Bench VC (BVC) dispersion as an indicator of engine dispersancy performance. The BVC test rating was 33 for Branched Polyolefin 2e-g-Mah(NPPDA) while the control formulation measured 120. The control was Branched Polyolefin 2e with no derivatization. A rating below 50 was considered very good, while a rating above 80 was considered unacceptable.

The procedure above was designed to result in approximately one bound maleic anhydride group per polyolefin arm. The following example was designed to result in approximately one bound maleic anhydride group per molecule of Branched Polyolefin.

(b) Procedure 27a was repeated with the following exceptions: 0.6 g maleic anhydride and 0.3 g of dicumyl peroxide in 25 ml hexane were used, to provide a grafted Branched Polyolefin 2e-g-Mah with 0.15 wt % bound maleic anhydride.

The hexane solution of grafted Branched Polyolefin was combined in SNO-100 oil and treatment with 0.18 g of NPPDA in 0.4 g Surfonic L24-7 was carried out as described above in (a). The product analyzed for 0.18 wt % bound NPPDA, Branched Polyolefin 2e-g-Mah(NPPDA).

A 5W-30 engine oil formulation containing the product exhibited a BVC dispersancy rating of 49.

(c) Procedure 27a was repeated with the following exceptions: Branched Polyolefin 2i was derivatized with 1.3 g maleic anhydride, 0.65 g dicumyl peroxide in 25 ml hexane to provide a grafted Branched Polyolefin 2i-g-Mah with a bound maleic anhydride content of 0.3 wt % on a polymer basis as measured by titration.

The hexane solution was combined with SNO-100 oil to provide a 11 wt % polymer content, after removal of the hexane. The oil solution was reacted with 0.32 g NPPDA in 0.75 g surfonic L24-7 as described above in 27a to provide a Branched Polyolefin 2i-g-Mah(NPPDA) with 0.4 wt % bound NPPDA.

A 5W-30 engine oil formulation containing 2i-g-Mah (NPPDA) concentrate exhibited a BVC dispersancy rating of 48.

(d) Procedure 27a was repeated with the following exceptions: Branched Polyolefin 2j was derivatized with 2.5 g maleic anhydride, 1.24 g dicumyl peroxide in 25 cc hexane to provide a grafted Branched Polyolefin 2j-g-Mah with a bound maleic anhydride content of 0.6 wt % on a polymer basis as measured by.titration.

The hexane solution was combined with SNO-100 oil to provide a 10.4 wt % polymer content, after removal of the hexane. The oil solution was reacted with 0.58 g NPPDA in 1.36 g Surfonic L24-7 as described above in 27a to provide a Branched Polyolefin 2j-g-Mah(NPPDA) with 0.8 wt % bound NPPDA.

A 10W40 engine oil formulation containing 2j-g-Mah (NPPDA) concentrate exhibited a BVC dispersancy rating of 45.

EXAMPLE 28

Branched Polyolefins from High Molecular Weight Prearms

The following example demonstrates the utility of blends of comb branched polyolefins with high molecular weight linear polyolefins as viscosity index improvers. The blends result from the synthesis of comb branched polyolefins via a hydrosilation reaction with polyolefin prearms having an $M_n$ greater than 30,000 g/mole.

An ethylene-propylene prearm was prepared according to the procedure of Polymer B using the following reaction conditions:

| | |
|---|---|
| Hexane (kg/hr) = 3.1 | Catalyst [Et(Flu)$_2$ZrCl$_2$]($\mu$mol/hr) = 9.7 |
| Ethylene (nl/hr) = 209.9 | Cocatalyst[methylaluminoxane] |
| Propylene (nl/hr) = 192.2 | (m mol/hr) = 9.7 |
| Production (g/hr) = 330 | Polymerization temperature (° C.) = 63 |
| | Reactor residence time (min) = 10 |

The ethylene-propylene prearm was analyzed as follows:

| | |
|---|---|
| Mn (kg/mol) = 40 | C$_2$ (mol %) = 62 |
| Mw (kg/mol) = 84 | 8 vinyl groups |
| MWD = 2.1 | 25 vinylidene groups |

(a) A Hydrosilation reaction was carried out according to the general procedure of Example 2 using a PMHS with 50 Si—H groups except that the reaction temperature was stirred 170° C. for 48 hours. The blend was analyzed by SEC-DV to show a Mn of 60,000, Mw of 140,000, IV=1.32 dl/g, % CE of 70. The number of arms on the branched polyolefin cannot be accurately calculated from the SEC-DV data since there is overlap between the data for the high molecular weight linear ethylene-propylene prearm and the branched polyolefin. It is postulated that the fraction of prearms actually undergoing hydrosilation in this example was predominately the lower molecular weight fraction of the ethylene-propylene prearm, resulting in a branched polyolefin polymer containing low molecular arms. The MWD of this branched polyolefin coincides with the MWD of the residual linear polyolefin prearm, which obscures the calculation of the number of arms of the branched polyolefin.

(b) A second Hydrosilation reaction was carried out as above except that the temperature was 130° C. for 71 hours. The resulting blend analyzed by SEC-DV showed a Mn of 85,000 g/mol, Mw of 195,000 g/mol, IV of 1.5 dl/g, % CE of 69.

(c) The blends isolated from 28a and 28b were dissolved in SNO-100 oil per the conditions of Example 4 and their additive properties were tested as viscosity index improvers. The data are in Table 7 below and is compared with a commercial viscosity index improver in the form of a linear ethylene-propylene copolymer having a Mn of 37,000, a Mw of 82,000, and an ethylene content of 55 mol %.

TABLE 7

Branched Polyolefin Blends

| | TP (cSt) | PC (%) | SSI (%) | CCS (cP) | MRV (cP) |
|---|---|---|---|---|---|
| 28a | 6.6 | 1.2 | 24 | 3360 | 17400 |
| 28b | 6.6 | 1.0 | 26 | 3250 | 16000 |
| comparative | 6.5 | 1.6 | 24 | 3900 | 24000 |

The blends of example 28 provide equivalent thickening power at a lower polymer content and correspondingly improved low temperature properties (lower CCS and MRV).

This example demonstrates that branched polyolefin additives useful as improved viscosity index improvers can be obtained from hydrosilation reactions with polyolefin prearms having a Mn of greater than 30,000 g/mole when the coupling efficiency is no more than 70%. This example further demonstrates that improved viscosity index improvers can be prepared by blending linear ethylene-propylene copolymers having a Mn of greater than or equal to 35,000 g/mole with branched polyolefin additives prepared from polyolefin prearms having a Mn of less than 20,000 g/mole.

From this example one concludes that improved viscosity index improvers result additionally from coupling reactions with polyolefin prearms blends wherein the blend consists of 1–99 weight percent of short prearms, those having a Mn of 1000–15,000 and 99–1 weight percent of long prearms, those having a Mn of 15,000–100,000.

What is claimed is:

1. A composition comprising a lubricating oil and an additive, wherein the additive is a branched polyolefin polymer in the form of a comb or star, containing a plurality of arms which are copolymers of ethylene with propylene, said arms have a number average molecular weight in the range of 1,000 to 100,000 g/mol and being linked to the polymer backbone, said polymeric backbone being selected from the group of homo and copolymers of polyhydrosilanes containing at least 4–50 polyolefin arms prepared by coupling the polyolefin pre-arms with a reactive polymeric backbone to form the branched polyolefin.

2. A composition containing an additive as defined in claim 1 wherein the reactive polymeric backbone contains at least 6 functional groups capable of undergoing a coupling reaction with the polyolefin prearms.

3. A composition containing an additive as defined in claim 1 wherein the polyolefin prearm contains terminal unsaturation selected from the group consisting of vinyl unsaturation, vinylidene unsaturation and vinylene unsaturation.

4. A composition containing an additive as defined in claim 3 wherein the terminal unsaturation is reacted with functional groups in the reactive polymeric backbone.

5. A composition containing an additive as defined in claim 1 wherein the polyolefin prearm is an ethylene-propylene copolymer having terminal unsaturation.

6. A composition containing an additive as defined in claim 1 wherein the molecular weight distribution of the polyolefin prearm ranges from about 1.5 to about 3.5.

7. A composition containing an additive as defined in claim 1 wherein the polyhydrosilane polymer is a silicon-containing polymer backbone having repeating units of the general formula:

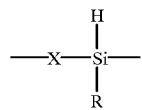

wherein X is a heteroatom or one or more carbon atoms forming part of a group selected from aliphatic groups and aromatic groups and R is hydrogen or an organic group.

8. A composition containing an additive as defined in claim 1 wherein the reactive polymeric backbone is formed from a polysiloxane have the general formula:

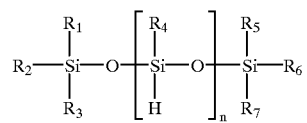

wherein $R_1$ to $R_7$ is each independently hydrogen or an organic group and n is an integer of at least about 10.

* * * * *